(12) United States Patent
Tsang et al.

(10) Patent No.: US 10,719,649 B2
(45) Date of Patent: Jul. 21, 2020

(54) FULL WAVE MODELING AND SIMULATIONS OF THE WAVEGUIDE BEHAVIOR OF PRINTED CIRCUIT BOARDS USING A BROADBAND GREEN'S FUNCTION TECHNIQUE

(71) Applicants: Leung W. Tsang, Ann Arbor, MI (US); Shaowu Huang, Steilacoom, WA (US)

(72) Inventors: Leung W. Tsang, Ann Arbor, MI (US); Shaowu Huang, Steilacoom, WA (US)

( * ) Notice: Subject to any disclaimer, the term of this patent is extended or adjusted under 35 U.S.C. 154(b) by 0 days.

(21) Appl. No.: 15/918,890

(22) Filed: Mar. 12, 2018

(65) Prior Publication Data

US 2018/0203966 A1 Jul. 19, 2018

Related U.S. Application Data

(62) Division of application No. 15/056,808, filed on Feb. 29, 2016, now Pat. No. 9,946,825.

(Continued)

(51) Int. Cl.
*G06F 30/00* (2020.01)
*G06F 30/367* (2020.01)
(Continued)

(52) U.S. Cl.
CPC ............ *G06F 30/367* (2020.01); *G06F 30/30* (2020.01); *G06F 30/398* (2020.01); *G06F 2119/10* (2020.01)

(58) Field of Classification Search
CPC . H01L 2224/83895; H01L 2224/83896; H01L 2224/48177; H01L 2224/48227;
(Continued)

(56) References Cited

U.S. PATENT DOCUMENTS 7,149,666 B2 * 12/2006 Tsang .................... G06F 30/367
703/2
7,359,929 B2 4/2008 Tsang et al.
(Continued)

OTHER PUBLICATIONS

Tsang et al. "Fast and Broadband Modeling Method for Multiple Vias With Irregular Antipad and Arbitrarily Shaped Pover/Ground Planes in 3-D IC and Packaging Based on Generalized Foldy-Lax Equations" Apr. 2014 IEEE Xplore p. 1-23 (Year: 2014).*
(Continued)

*Primary Examiner* — Binh C Tat
(74) *Attorney, Agent, or Firm* — Seed IP Law Group LLP

(57) ABSTRACT

A broadband Green's function computation technique that employs low wavenumber extraction on a modal summation is used to model the waveguide behavior of electronic components, systems, and interconnects on a printed circuit board. Use of the broadband technique permits discretizing the surface of the printed circuit board across a wide range of frequencies all at once. The broadband Green's function is also extended to via waveguides on circuit boards and power/ground plane waveguides of arbitrary shape. Such a method can analyze a given circuit board geometry over a broad frequency range several hundred times faster than is otherwise possible with existing commercial analysis tools. The present method is useful in electronic design automation for analyzing signal integrity and power integrity, reducing electromagnetic interference and ensuring electromagnetic compatibility.

14 Claims, 22 Drawing Sheets

Related U.S. Application Data

(60) Provisional application No. 62/152,702, filed on Apr. 24, 2015.

(51) Int. Cl.
　　*G06F 30/30* (2020.01)
　　*G06F 30/398* (2020.01)
　　*G06F 119/10* (2020.01)

(58) Field of Classification Search
　　CPC ........... H01L 2224/49175; H01L 24/29; H01L 24/32; G02B 6/0065; G06F 2119/10; G06F 30/30; G06F 30/367; G06F 30/398
　　USPC .................................................. 716/100–109
　　See application file for complete search history.

(56) References Cited

U.S. PATENT DOCUMENTS

| | | | |
|---|---|---|---|
| 9,946,825 B2* | 4/2018 | Tsang ................. | G06F 17/5036 |
| 2003/0072130 A1 | 4/2003 | Tsang et al. | |
| 2004/0268287 A1* | 12/2004 | Toh ........................ | H01P 3/081 |
| | | | 716/137 |
| 2005/0102343 A1 | 5/2005 | Tsang et al. | |
| 2012/0323356 A1 | 12/2012 | Dziura et al. | |
| 2013/0080984 A1 | 3/2013 | Liu et al. | |
| 2014/0300695 A1 | 10/2014 | Smalley et al. | |
| 2016/0314231 A1 | 10/2016 | Tsang et al. | |
| 2016/0357884 A1 | 12/2016 | Makarov et al. | |
| 2018/0011014 A1 | 1/2018 | Setija et al. | |

OTHER PUBLICATIONS

Chang et al., "Fast and Broadband Modeling Method for Multiple Vias With Irregular Antipad in Arbitrarily Shaped Power/Ground Planes in 3-D IC and Packaging Based on Generalized Foldy-Lax Equations," *IEEE Transactions on Components, Packaging and Manufacturing Technology* 4(4):685-696, 2014.

Huang et al., "Fast Broadband Modeling of Traces Connecting Vias in Printed Circuit Boards Using Broadband Green's Function Method," *IEEE Transactions on Components, Packaging and Manufacturing Technology*, 2017, 13 pages.

Huang et al., "Fast Electromagnetic Analysis of Emissions From Printed Circuit Board Using Broadband Green's Function Method," *IEEE Transactions on Electromagnetic Compatibility* 58(5):1642-1652, 2016.

Liao et al., "High Order Extractions of Broadband Green's Function with Low Wavenumber Extractions for Arbitrary Shaped Waveguide," *Progress in Electromagnetics Research* 158:7-20, 2017.

Tsang, "Broadband Calculations of Band Diagrams in Periodic Structures Using the Broadband Green's Function with Low Wavenumber Extraction (BBGFL)," *Progress in Electromagnetics Research*, 153:57-68, 2015.

Tsang et al., "Broadband Green's Function with Low Wavenumber Extraction for Arbitrary Shaped Waveguide and Applications to Modeling of Vias in Finite Power /Ground Plane," *Progress in Electromagnetics Research* 152:105-125, 2015.

Lehmann, "The Green Function of Ideal Crystals and Electronic Properties of Localized Defects in Metals," 1975, 12 pages.

Tsang et al., "Modeling of vias sharing the same antipad in planar waveguide with boundary integral equation and group T-matrix method," IEEE Transactions on Components, Packaging, and Manufacturing Technology, 2013, 13 pages.

Tsang et al., "Calculations of band diagrams and low frequency dispersion relations of 2D periodic dielectric scatterers using broadband Green's function with low wavenumber extraction (BBGFL)" 2016, 21 pages.

Huang et al., "Broadband Green's function and applications to fast electromagnetic modeling of high speed interconnects," IEEE International Symposium on Antennas and Propagation & USNC/URSI National Radio Science Meeting, 2015, 2 pages.

Zhao et al., "Green's function for photonic crystal slabs," 2005, 6 pages.

Tan et al., "Green's Functions, including scatterers, for photonic crystals and metamaterials", *Journal of the Optical Society of America B*, vol. 34(7), Jul. 2017, 9 pages.

Tan et al., "Arbitrary Wire Medium Characterization Using 3D Broadband Green's Function with Higher Order Low Wavenumber Extractions", *IEEE Transactions on Antennas and Propagation*, Sep. 2017, 7 pages.

Tan et al., "Scattering of Waves by a Halfspace of Periodic Scatterers Using Broadband Green's Function", *Optics Letters*, Sep. 2017, pp. 1-5.

\* cited by examiner

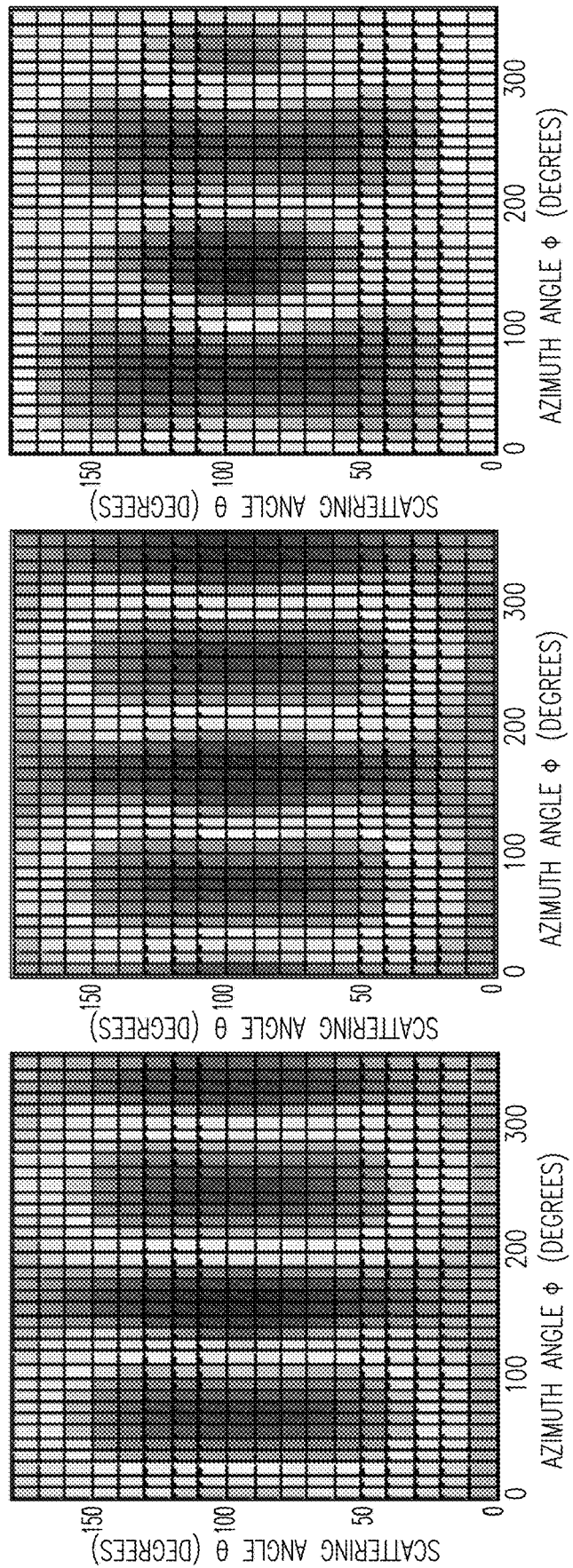

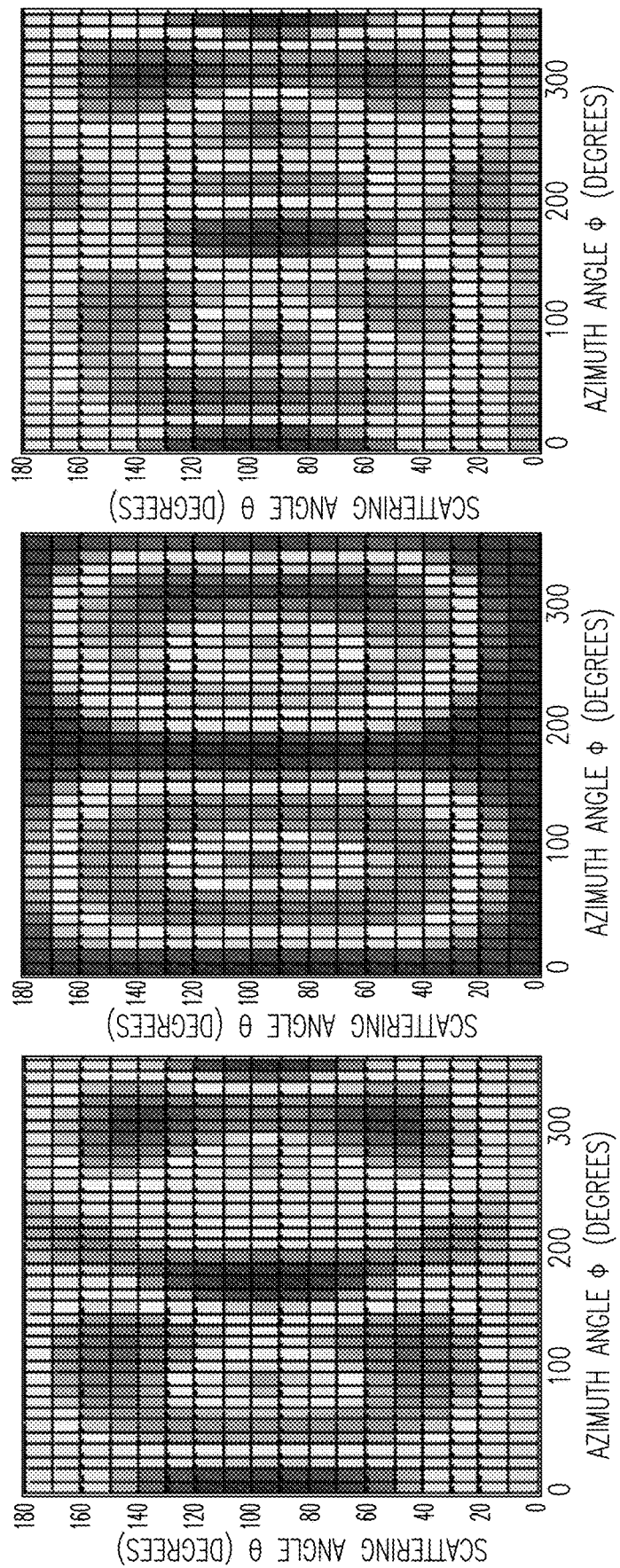

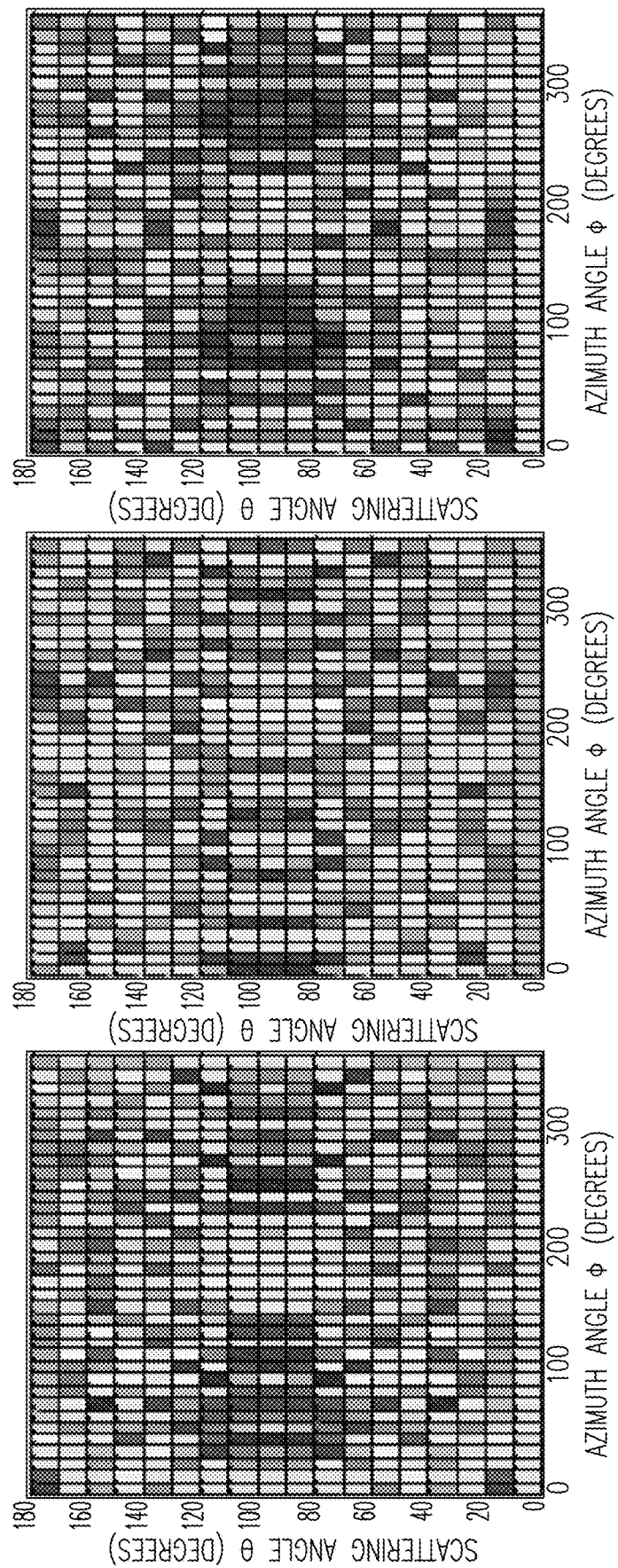

FULL WAVE MODELING AND SIMULATIONS OF THE WAVEGUIDE BEHAVIOR OF PRINTED CIRCUIT BOARDS USING A BROADBAND GREEN'S FUNCTION TECHNIQUE

The present patent application claims benefit of U.S. provisional patent application No. 62/152,702, filed on Apr. 24, 2015 and U.S. patent application Ser. No. 15/056,808, filed on Feb. 29, 2016, which are herein incorporated by reference in their entirety.

TECHNICAL FIELD

The present disclosure relates to modeling electromagnetic behaviors of signals, power noise, and radiated emissions of electronic components and systems and, in particular, to analyzing the high-frequency waveguide behavior of interconnects in multi-layer printed circuit boards or packages.

BRIEF SUMMARY

Electronic components, devices, and systems that include printed circuit boards (PCBs) or packaged integrated circuits (ICs) can generate or emit distorted high speed signals, power noise, and electromagnetic radiation that can be amplified by waveguides or cavity structures located on the PCB. For example, adjacent power and ground planes within a PCB form a waveguide that can cause problems with signal integrity (SI), power integrity (PI), electromagnetic interference (EMI), and electromagnetic compatibility (EMC). For example, such a waveguide may amplify signal distortion, crosstalk, power noise, couplings, and radiated emissions at resonant frequencies of the power/ground plane pair. Vias that form vertical connections in a multilayer PCB can act as sources, victims, or attackers, with respect to SI, PI, and EMI. For instance, vias can support propagation of electromagnetic waves that cause the PCB to radiate and thus generate EMI and EMC issues. EMI can be especially problematic for radio frequency (RF) and microwave circuits that support wireless communication, for example, in laptop computers, tablet computers, smart phones, and other mobile computing devices. EMC can be an important aspect of industrial product development because electronic devices must pass EMC certificate tests regulated by the Federal Communication Commission (FCC). Furthermore, RF and microwave circuits may rely on resonant modes of waveguide structures on a PCB for their functional operation, which makes them particularly vulnerable to electromagnetic distortion that arises in the structures of the PCB.

As power supply levels decrease and operating frequencies increase, the effects of PCB structures become more significant. By modeling PCB designs, it is possible to simulate such effects. The simulation results can then be used to adjust the circuit designs and circuit board layouts prior to manufacturing, so as to avoid problematic resonances. PCB structures of interest include, for example, stack-ups, locations of vias, and trace routings. However, existing full wave electromagnetic simulation tools tend to be computationally complex and inefficient, and they are generally not suitable for fast broadband analysis.

The present inventors have recognized that conventional use of the method of moments (MoM), based on a free space Green's function, to model waveguide behavior of interconnects associated with PCBs and IC packages is a slow process that entails computing a solution to a set of surface integral equations having a large number of surface unknowns for each frequency of interest. Extending such a method to create a broadband solution that addresses many frequencies with many surface unknowns, one at a time in a serial manner, is computationally intensive, inefficient, and therefore impractical.

Alternatively, use of a broadband Green's function computational model (BBGFL) that employs a technique known as low wavenumber extraction, as described herein, permits simulations of PCB interconnects for all frequencies at a low computation cost, e.g., across a broad frequency range such as 0.1-20 GHz. This is achieved by computing the Green's function at a single low wavenumber, or long wavelength, combining the low wavenumber Green's function with a computational method that features fast convergence of mode summations, and deriving results for the rest of the frequency range. Use of such a low wavenumber extraction technique is suitable for fast computer-aided design (CAD) in high-speed interconnects.

The broadband Green's function method with low wavenumber extraction can perform the necessary calculations several hundred to several thousand times faster than is otherwise possible using known methods, as detailed in "Broadband Green's Function and Applications to Fast Electromagnetic Analysis of High-Speed Interconnects," a University of Washington doctoral dissertation by Shaowu Huang (2015, hereinafter "Huang"), portions of which are summarized in this document, and which dissertation is incorporated by reference herein in its entirety. Details of some portions can also be found in L. Tsang and S. Huang, "Broadband Green's function with low wavenumber extraction for arbitrary shaped waveguide and applications to modeling of vias in finite power/ground plane," Progress in Electromagnetic Research, vol. 152, pp 105-125, 2015, (hereinafter, "Tsang and Huang").

In one embodiment of the present method, a broadband Green's function with low wavenumber extraction is developed for waveguides having cross-sections of arbitrary shape. This is in contrast to existing Green's functions that have been limited to regular shapes such as rectangular and circular waveguides. The present technique can be combined with a Foldy-Lax scattering technique or a MoM method that uses a broadband Green's function instead of a free space Green's function to permit fast simulation of vias in arbitrarily-shaped PCB power/ground planes.

The broadband Green's function computation technique that employs low wavenumber extraction has been applied to the particular problem of modeling radiated emissions from a power bus structure on PCBs up to 5 inches across, for a frequency range of 0.1-10 GHz. The present broadband Green's function technique is used to compute equivalent magnetic surface currents along the boundary walls of arbitrarily shaped power/ground planes. Results obtained using the broadband Green's function technique method as described herein agree well with those obtained using existing commercial analysis tools, but with significant improvement in computational efficiency. The present broadband Green's function technique is useful in electronic design automation (EDA), for addressing SI and PI issues, and for reducing EMI and ensuring electromagnetic compatibility (EMC).

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the drawings, identical reference numbers identify similar elements or acts. The sizes and relative positions of elements in the drawings are not necessarily drawn to scale.

FIGS. 13E-13G are angular maps of electric fields emitted by the first exemplary power/ground plane pair at 10 GHz, according to an embodiment as described herein.

FIGS. 14B-14D are angular maps of electric fields radiated by the second exemplary power/ground plane pair at 2 GHz, according to an embodiment as described herein.

FIGS. 14E-14G are angular maps of electric fields radiated by the second exemplary power/ground plane pair at 10 GHz, according to an embodiment as described herein.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Specific embodiments are described herein with reference to computational analysis and modeling tools that have been produced; however, the present disclosure and the reference to certain characteristics of such tools, and the details and ordering of processing steps, are exemplary and should not be limited to those shown.

Figure 1:
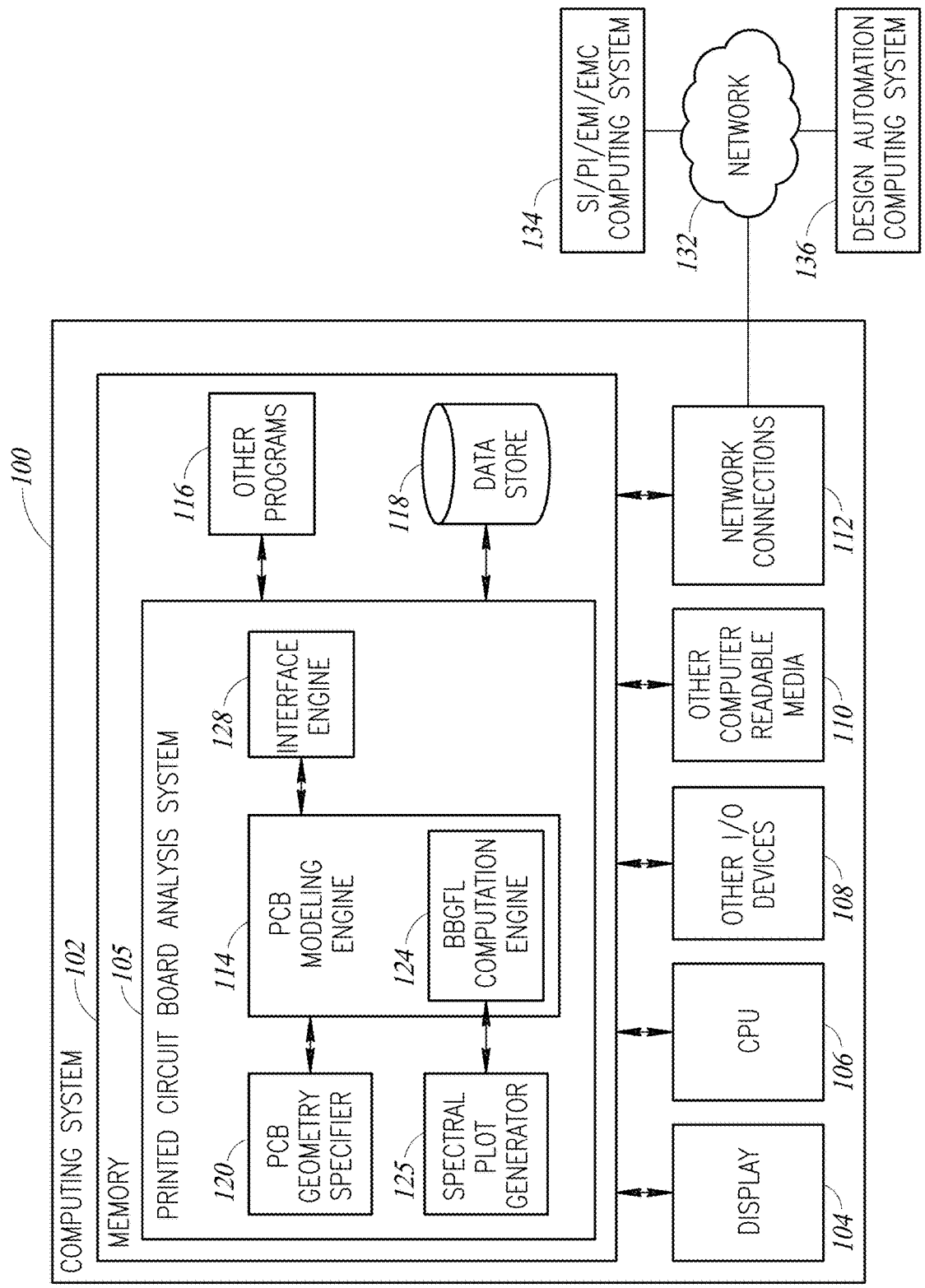
FIG. 1 is a block diagram of an exemplary special purpose computing system for practicing embodiments of analysis and simulation methods described herein.

FIG. 1 shows a special purpose computing system 100 for performing electromagnetic analysis of high-speed interconnects in PCBs, according to one embodiment. The computing system 100 is coupled via a network 132 to other special purpose computing systems such as, for example, an electromagnetic compatibility (EMC) computing system 134 and a design automation computing system 136.

In the exemplary embodiment shown, the computing system 100 comprises a non-transitory processor-readable memory 102, a display 104, one or more Central Processing Units (CPUs) 106, Input/Output devices 108 (e.g., keyboard, mouse, joystick, track pad, display, and the like), other computer-readable media 110, and network connections 112.

A printed circuit board analysis system 105 is shown residing in the memory 102. In an embodiment, the printed circuit board analysis system 105 includes a PCB modeling engine 114, a data store 118, a PCB geometry specifier 120; a broadband Green's Function (BBGFL) computation engine 124, a spectral plot generator 125, and an interface engine 128. In an embodiment, the (BBGFL) computation engine 124 is a part of the PCB modeling engine 114. In other embodiments, some portion of the contents or some or all of the components of the printed circuit board analysis system 105 may be stored on and/or transmitted over other computer-readable media 110. The components of the printed circuit board analysis system 105 are in the form of instructions that are executable on the CPU 106 and generate data for use in the computing systems 134 and 136, as described herein.

Other and/or different modules may also be implemented in the PCB modeling engine 114. In addition, the PCB modeling engine 114 interacts via the network 132 with the EMC computing system 134 and the design automation computing system 136. The network connections 112 may utilize one or more protocols to communicate via one or more physical networks, including local area networks, wireless networks, dedicated lines, intranets, the Internet, and the like.

The PCB geometry specifier 120 performs at least some of the functions described herein, with respect to the processes described herein. In particular, the PCB geometry specifier 120 interacts with the PCB modeling engine 114 to supply one or more descriptions of PCB geometries, and stores those descriptions in the data store 118 for processing by other components of the PCB modeling engine 114. The PCB modeling engine 114 performs at least some of the functions described with reference to FIG. 2 below. In particular, the PCB modeling engine 114 generates a PCB model based on one or more descriptions of a PCB geometry that are obtained from the data store 118 or directly from the PCB geometry specifier 120. Model generation may be based on at least some inputs received from the interconnected computing systems 134, 136.

In addition, at least some aspects of the model generation may be performed by microprocessor-based devices. In particular, to generate a PCB model, the PCB modeling engine 114 may use output from the BBGFL computation engine 124 which employs various analysis methods, used alone or in combination with one another, to analyze the electromagnetic behavior of structures on a PCB, as further described herein. Such computerized and/or computer-assisted techniques are further described with respect to FIGS. 2-14G below. After the PCB modeling engine 114 generates a model, it can store the generated model in the data store 118 for further processing by the BBGFL computation engine 124.

The spectral plot generator 125 displays output data from the BBGFL computation engine 124 based on models stored in the data store 118. In some embodiments, the spectral plot generator 125 facilitates transmission of spectral information that may or may not be incorporated into a circuit design. For example, the spectral plot generator 125 may transmit spectral information based on, or derived from, models stored in the data store 118. Such spectral information may be provided to, for example, third-party systems that generate circuit designs for PCBs based on the provided information.

The interface engine 128 facilitates user interaction with the PCB modeling engine 114 and its various components. For example, the interface engine 128 may implement a user interface engine. The user interface engine may provide an interactive graphical user interface (GUI) that can be used by a human being operating the computing system 100. The operator may interact with the PCB modeling engine 114 to perform functions such as specifying regions of interest in an existing PCB design for input to the PCB geometry specifier. In at least some embodiments, access to the functionality of the interface engine 128 is provided via a Web server, possibly executing as one of the other programs 116.

In some embodiments, the interface engine 128 provides programmatic access to one or more functions of the PCB modeling engine 114. For example, the interface engine 128 provides a programmatic interface (e.g., as a Web service, static or dynamic library, etc.) to one or more functions of the PCB modeling engine 114 that may be invoked by one of the other programs 116 or by some other module. In this manner, the interface engine 128 facilitates the development of third-party software, such as user interfaces, plug-ins, adapters (e.g., for integrating functions of the PCB modeling engine 114 into desktop applications, Web-based applications, mobile device applications, embedded applications, etc.), and the like. In addition, the interface engine 128 may be, in at least some embodiments, invoked or otherwise accessed via remote entities, such as the design automation computing system 136, and/or the EMC computing system 134, to access various functionalities of the PCB modeling engine 114.

Other code or programs 116 (e.g., a Web server, a database management system, and the like) and potentially other data repositories, such as a data store 118, also reside in the memory 102. The other programs 116 also may execute on the CPU(s) 106. Not all of the components in FIG. 1 are required for each implementation. For example, some embodiments embedded in other software do not provide means for user input, for display, for a customer computing system, or other components. The data store 118 stores information related to the PCB modeling functions performed by the PCB modeling engine 114. Such information may include circuit data, model data, and/or data representing computational results.

In an example embodiment, components/modules of the printed circuit board analysis system 105 can be implemented using standard programming techniques. For example, the PCB modeling engine 114 may be implemented as a "native" executable code running on the CPU 106, along with one or more static or dynamic libraries. In other embodiments, the PCB modeling engine 114 can be implemented as instructions processed by a virtual machine that executes as one of the other programs 116. In general, a range of programming languages known in the art may be employed for implementing such example embodiments, including representative implementations of various programming language paradigms, including but not limited to, object-oriented languages (e.g., Java, C++, C #, MATLAB®, Visual Basic. NET, Smalltalk, and the like), functional languages (e.g., ML, Lisp, Scheme, and the like), procedural languages (e.g., C, Pascal, Ada, Modula, and the like), scripting languages (e.g., Perl, Ruby, Python, JavaScript, VBScript, and the like), and declarative languages (e.g., SQL, Prolog, and the like). Portions of the PCB modeling engine 114, including the BBGFL computation engine 124, may simply be implemented as files or macros within a spreadsheet processing program such as, for example, Microsoft Excel™.

The embodiments described above may also use well-known synchronous or asynchronous client-server computing techniques. However, the various components may be implemented using more monolithic programming techniques as well, for example, as an executable running on a single CPU computer system or, alternatively, decomposed using a variety of structuring techniques known in the art, including but not limited to, multiprogramming, multithreading, client-server, or peer-to-peer, running on one or more computer systems each having one or more CPUs. Some embodiments execute concurrently and asynchronously, and communicate using message passing techniques. Equivalent synchronous embodiments are also supported by a building structure estimation system implementation. Also, other functions could be implemented and/or performed by each component/module, and in different orders, and by different components/modules, yet still achieve the functions of the PCB modeling engine 114.

In addition, programming interfaces to the data stored as part of the PCB modeling engine 114, such as in the building structure estimation system data store 118, can be available by standard mechanisms such as through C, C++, C #, and Java APIs; libraries for accessing files, databases, or other data repositories; through scripting languages such as XML; or through Web servers, FTP servers, or other types of servers providing access to stored data. For example, the data store 118 may be implemented as one or more database systems, file systems, memory buffers, or any other technique for storing such information, or any combination of the above, including implementations using distributed computing techniques.

In an embodiment, the printed circuit board analysis system 105 can be implemented in a distributed environment comprising multiple, even heterogeneous, computer systems and networks. For example, the PCB geometry specifier 120, the BBGFL computation engine 124, the spectral plot generator 125, the interface engine 128, and the data store 118 may all be located in physically different computer systems. In another embodiment, various modules of the printed circuit board analysis system 105, including the BBGFL computation engine 124, are hosted each on a separate server machine and are remotely located from the tables which are stored in the data store 118. Also, one or more of the modules may themselves be distributed, pooled or otherwise grouped, such as for load balancing, reliability or security reasons. Different configurations and locations of programs and data are contemplated for use with techniques described herein. A variety of distributed computing techniques are appropriate for implementing the components of the illustrated embodiments in a distributed manner including, but not limited to, TCP/IP sockets, RPC, RMI, HTTP, Web Services (XML-RPC, JAX-RPC, SOAP, and the like).

Furthermore, in some embodiments, some or all of the components of the printed circuit board analysis system 105 are implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 2:
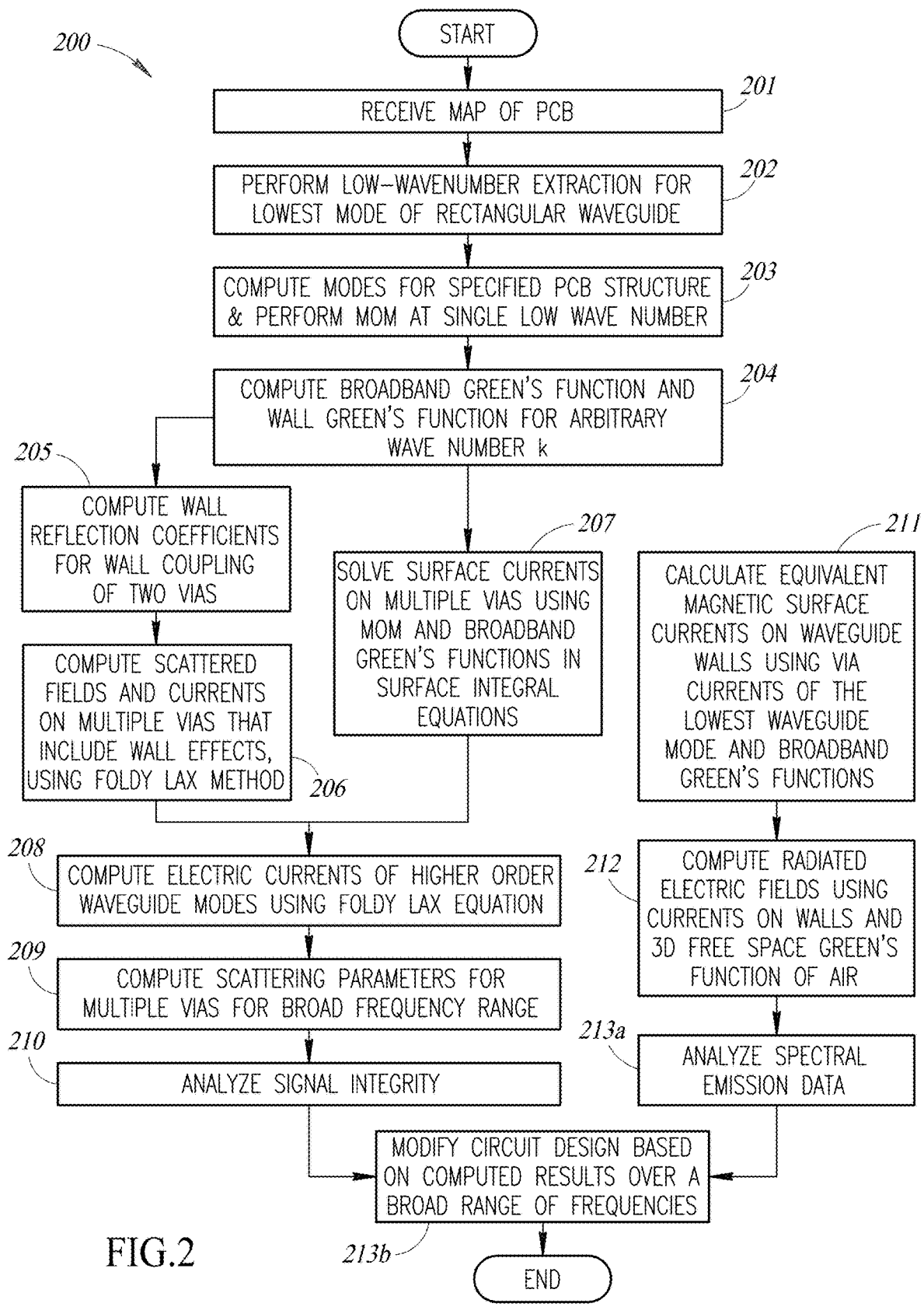
FIG. 2 is a flow diagram illustrating steps in a method of analyzing the waveguide behavior of a printed circuit board having a specified configuration of vias, according to an embodiment described herein.

FIG. 2 shows a sequence of steps in a computer-implemented method 200 of modeling electromagnetic resonances in an exemplary waveguide on a PCB, according to an embodiment. The modeling computations may be carried out by the BBGFL computation engine 124 within the PCB modeling engine 114 shown in FIG. 1. The computing system 100 may include a microprocessor, or CPU 106 and the memory 102 storing instructions that cause the CPU 106 to perform the modeling computations as described below. Performing such modeling computations provides PCB designers with a tool for predicting the operational behavior of PCB structures. The computer-implemented method 200 is thus performed in accordance with the steps outlined below.

At 201, parameters describing the geometry of the PCB are transmitted from the PCB geometry specifier 120 to the PCB analysis system 105. The geometry of the PCB includes structures that may act as waveguides or cavities. The PCB geometry specifier 120 thus provides input parameters to the PCB modeling engine 114. The PCB geometry specifier 120 may receive information about the PCB geometry interactively from a user. Alternatively, the PCB geometry specifier 120 may extract a description of the PCB from the data store 118 or from the design automation computing system 136 via the network 132.

Figure 3:
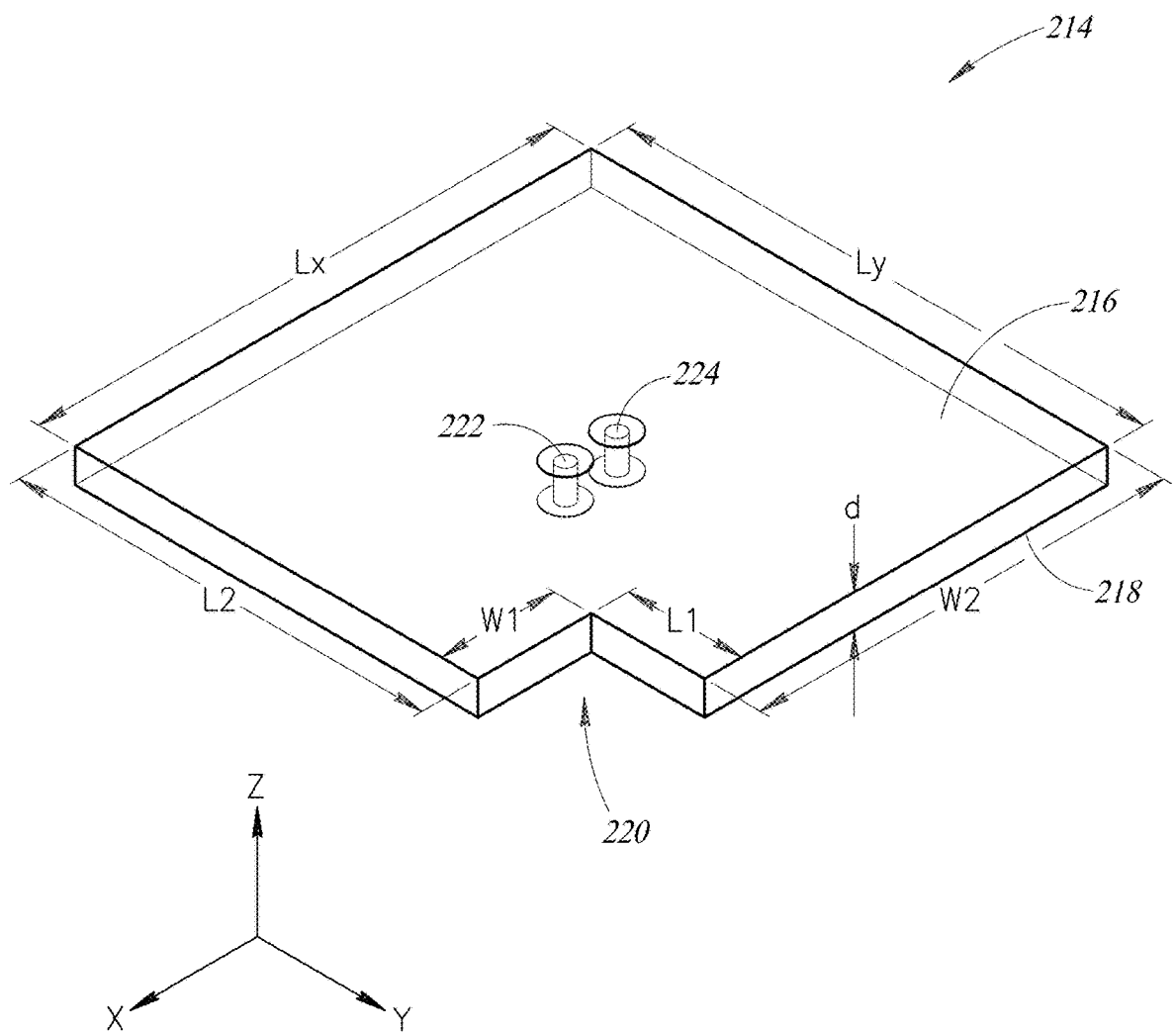
FIG. 3 is a perspective view of an exemplary L-shaped printed circuit board that includes a small cutout and two vias, according to an embodiment described herein.

An exemplary waveguide 214 on a PCB is shown in FIG. 3, according to an embodiment. The exemplary waveguide 214 is an L-shaped power/ground plane pair 216/218, which represents waveguides of arbitrary shape formed by various PCB structural components. The power/ground plane pair 216/218 consists of a conducting power plane 216 that is offset from a conducting ground plane 218 by a distance d. In an embodiment, the ground plane 218 is a copper foil on the PCB that is coupled to a ground terminal of a power supply for the PCB being modeled. The power plane 216 is also a copper foil that is coupled to the power supply to distribute power to various electronic components on the PCB via a power distribution network (PDN). Although the power/ground plane pair is meant to have the function of supplying power and ground to various chips on the PCB, the two facing copper planes may also, unintentionally, act as a parallel plate waveguide. The L-shaped power/ground plane pair 216/218 has planar dimensions $L_x \times L_y$ minus the area of a cutout region of arbitrary size W1×L1. The area of the L-shaped waveguide is therefore $L_x*L_y-W1*L1$. In an embodiment, $L_x$ and $L_y$ are in the range of about 300-400 mils in length.

Figure 4A:
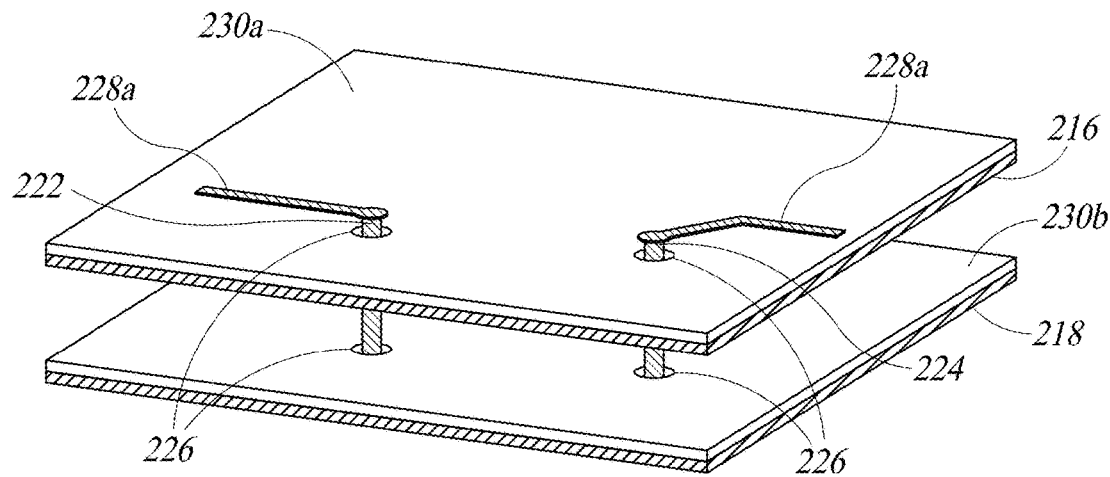
FIG. 4A is a perspective view of power and ground planes of the PCB shown in FIG. 3, showing two vias coupled to traces above the power plane.
Figure 4B:
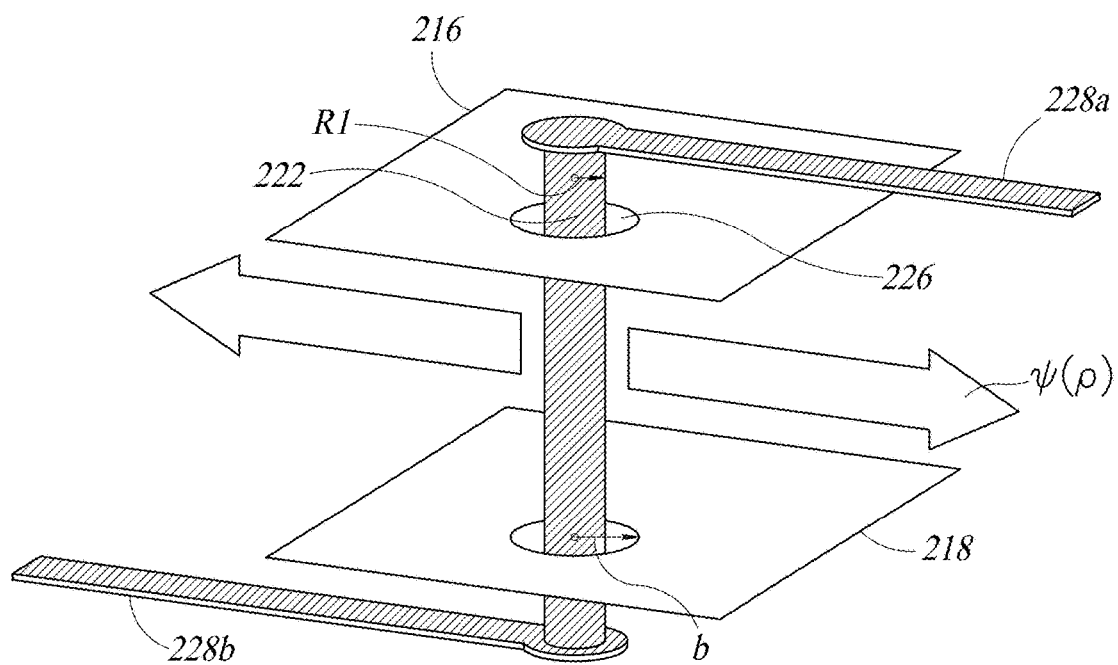
FIG. 4B is a magnified perspective view of one of the vias shown in FIG. 4A radiating an electromagnetic wave mode that propagates between the power and ground planes.
Figure 5:
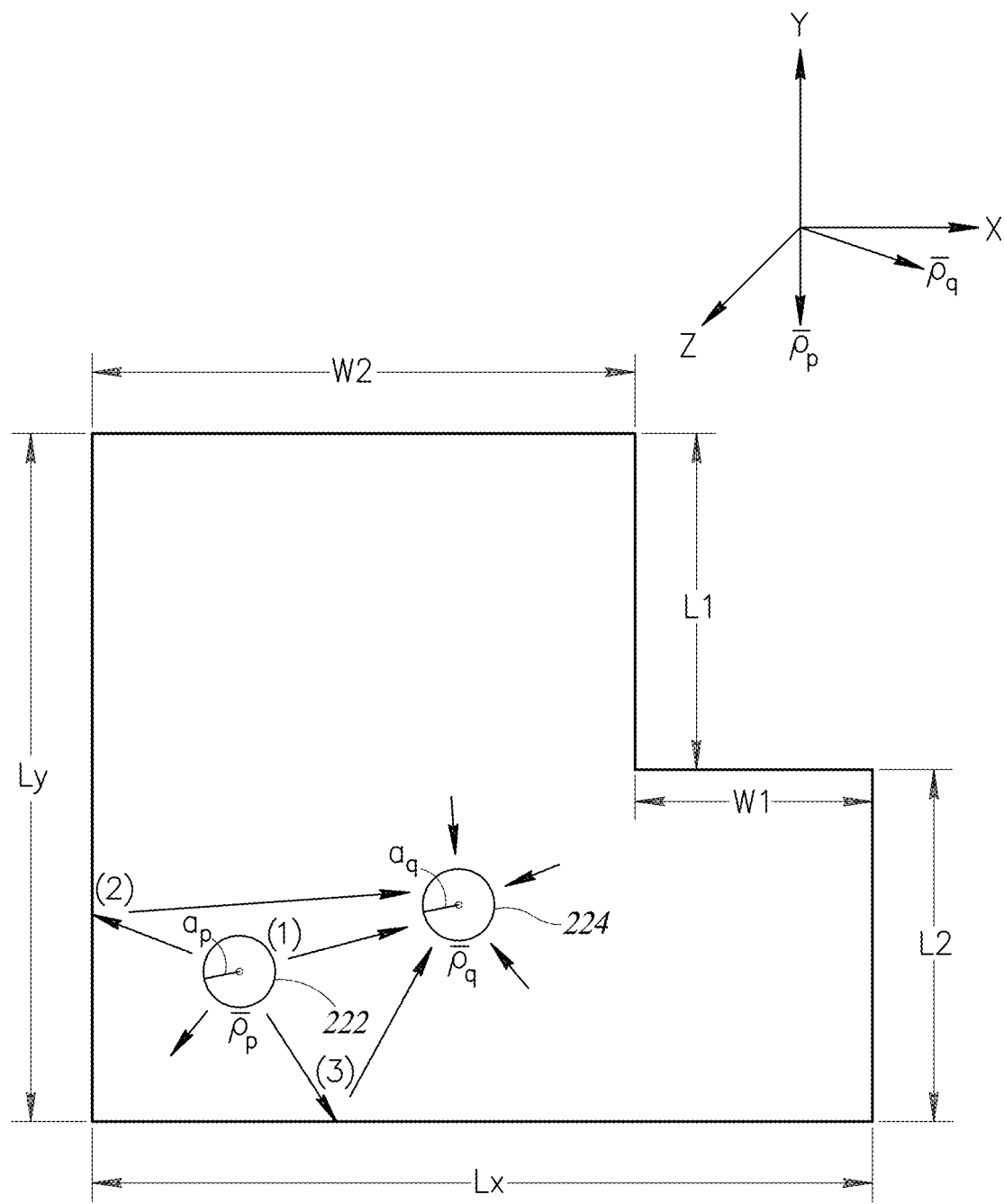
FIG. 5 is a top plan view of the exemplary printed circuit board shown in FIG. 3, onto which is superimposed a model of an electromagnetic wave transmitted by one of the two vias, and scattered waves received by the other via directly and indirectly through wall reflections.

With reference to FIGS. 3, 4A, 4B, and 5, near the center of the L-shaped power/ground plane pair 216/218 are located first and second vias, 222 and 224, respectively, according to an embodiment. The vias 222, 224 are metal structures formed as right circular cylinders having radii $a_p$ and $a_q$, respectively, and having centers positioned at vector coordinates $\overline{\rho}_p$ and $\overline{\rho}_q$ respectively, as in FIG. 5. In the magnified example shown in FIGS. 4A, 4B, the vias 222, 224 extend vertically through openings 226 formed in the power and ground planes 216, 218, respectively. The openings 226 may be filled with an insulating material to form an antipad of radius b. The vias 222, 224 may couple interconnecting wires, or traces, 228a of the multilayer PCB that are routed along a surface 230a of an insulating layer above the power plane 216 with other traces 228b routed along a surface 230b of an insulating layer below the ground plane 218. The traces 228a,b and the vias 222, 224 are electrically isolated from contact with the power and ground planes 216, 218 by the insulating layers. The vias 222, 224 are representative of structures in the PCB that, in operation, behave as parasitic antennas within the PCB. The via 222 represents an example of a transmitting antenna, and the via 224 represents an example of a receiving antenna. The two vias 222, 224 are exemplary, and can represent a larger number of vias. As shown in FIG. 4B, when current flows in the cylindrical via 222, the via 222 radiates, transmitting a cylindrical electromagnetic wave mode $\psi(\bar{\rho})$ that propagates outward, guided by the metallic power and ground planes 216, 218 that form the parallel plate waveguide 214. The wave mode $\psi(\bar{\rho})$ obeys the well-known time-independent Helmholtz wave equation, $$(\nabla^2 + k^2)\psi = 0, \quad (1)$$

wherein k is a wavenumber defined as $2\pi/\lambda$, wherein $\lambda$ is the wavelength of the transmitted mode, and $k^2 = \mu_0 \varepsilon_0 \varepsilon_r$, wherein $\varepsilon_r$ is the relative permittivity of the waveguide material. With reference to FIG. 5, the outgoing cylindrical waves $\psi(\bar{\rho})$, are transmitted from the via 222, which has a radius $a_p$ and is centered at a point $\bar{\rho}_p$. The outgoing cylindrical waves $\psi(\bar{\rho})$ are then incident on via 224, which has a radius $a_q$ and is centered at the point $\bar{\rho}_q$, either directly or indirectly. The cylindrical waves from via 222 may travel directly to via 224 along a path (1). Alternatively, the cylindrical waves from via 222 may be incident on, and reflected from, boundaries of the waveguide 214 along exemplary paths (2), (3) illustrated in FIG. 5. The resulting scattered cylindrical waves are then received by the via 224. In the following equations, $\bar{\rho}$ is a point located on the surface of a circle of radius $R_1$ outside the via 222 of radius $a_p$, and $\bar{\rho}'$ is a point located on the surface of a circle of radius $R_2$ outside the via 224 of radius $a_q$. According to the present method, the waveguide 214 is of arbitrary shape and contains multiple vias that are modeled as a group of scatterers having dimensions much smaller than the wavelength of the incident field. It is therefore sufficient to consider only a few harmonics of outgoing cylindrical waves from the vias. The scattered waves, having an associated scattered wavenumber k, can be calculated using a broadband Green's function that includes interactions of the incident wave and the scattered waves with the waveguide 214 of arbitrary shape. The broadband Green's functions are applicable to all frequencies. A Neumann boundary condition, $\hat{n}_r \cdot \psi = 0$, is used at the waveguide walls, which assumes that no energy loss occurs at the walls of the waveguide. An exemplary L-shaped waveguide is represented by superscript S.

Returning to FIG. 2, at 202, using a technique known as low wavenumber extraction, the broadband Green's function $g^\Omega(k, \bar{\rho}, \bar{\rho}')$ is first constructed for a rectangular waveguide $\Omega$:

$$g^\Omega(k, \bar{\rho}, \bar{\rho}') = g_0(k_L^\Omega, \bar{\rho}, \bar{\rho}') + g_R(k_L^\Omega, \bar{\rho}, \bar{\rho}') + \sum_\alpha \frac{k^2 - (k_L^\Omega)^2}{(k_\alpha^2 - k^2)(k_\alpha^2 - (k_L^\Omega)^2)} \psi_\alpha^\Omega(\bar{\rho}) \psi_\alpha^\Omega(\bar{\rho}'), \quad (2)$$

wherein $\psi_\alpha^\Omega(\bar{\rho})$ is a two-dimensional mode function of the rectangular waveguide, $k_L^\Omega$ is the low wavenumber for the rectangular waveguide, and $g_0(k_L^\Omega, \bar{\rho}, \bar{\rho}') + g_R(k_L^\Omega, \bar{\rho}, \bar{\rho}')$ is the single low wavenumber MoM solution for the rectangular waveguide. Using $g^\Omega(k, \bar{\rho}, \bar{\rho}')$ on the L-shaped waveguide S, a linear matrix equation is obtained for determining the modes of the L-shaped waveguide:

$$\bar{\bar{A}}\bar{b} = \frac{1}{k^2}\bar{b}, \quad (3)$$

wherein A is a matrix that includes wave interactions with the L-shaped waveguide. In equation (3), $$\frac{1}{k^2}$$

are the eigenvalues and $\bar{b}$ are the eigenvectors. The matrix $\bar{\bar{A}}$ is independent of the wavenumber so that all the eigenvalues can be determined simultaneously given all of the modes, the modal wavenumbers, and eigenvector solutions $\psi_\beta^S(\bar{\rho})$ for the L-shaped waveguide.

At 203, the low wavenumber Green's function at $k_L^S$, $g^S(k_L^S, \bar{\rho}, \bar{\rho}')$, can also be determined using the MoM, as is well known in the art. This low wavenumber MoM solution for the L-shaped waveguide is calculated only once.

At 204, the modal solutions, $\psi_\beta^S(\bar{\rho})$, and $g^S(k_L^S, \bar{\rho}, \bar{\rho}')$ are used to construct the broadband Green's functions at arbitrary k for the L-shaped waveguide:

$$g^S(k, \bar{\rho}, \bar{\rho}') = g^S(k_L^S, \bar{\rho}, \bar{\rho}') + \sum_\beta \frac{k^2 - (k_L^S)^2}{((k_\beta^S)^2 - k^2)((k_\beta^S)^2 - (k_L^S)^2)} \psi_\beta^S(\bar{\rho}) \psi_\beta^S(\bar{\rho}') \quad (4)$$

In equation (4), the broadband Green's function $g^S(k, \bar{\rho}, \bar{\rho}')$ is the sum of $g^S(k_L^S, \bar{\rho}, \bar{\rho}')$, the low wavenumber extraction and the modal summation in the second term of equation (4) representing the mode contributions. In this form it is applicable to the L-shaped waveguide S for all frequencies of interest applicable to the problems of vias. At a general wavenumber k, the broadband Green's function $g^S(k, \bar{\rho}, \bar{\rho}')$ is further decomposed into a free space function, $g_0(k, \bar{\rho}, \bar{\rho}')$, and a wall Green's function, $g_W^S(k, \bar{\rho}, \bar{\rho}')$. The broadband wall Green's function, which holds for arbitrary values of k, is then expressed as:

$$g_W^S(k, \bar{\rho}, \bar{\rho}') = g_0(k_L, \bar{\rho}, \bar{\rho}') + g_W(k_L, \bar{\rho}, \bar{\rho}') - g_0(k, \bar{\rho}, \bar{\rho}') + \sum_\beta \frac{k^2 - k_L^2}{(k_\beta^2 - k^2)(k_\beta^2 - k_L^2)} \psi(\bar{\rho}) \psi(\bar{\rho}') \quad (5)$$

It is noted that all factors other than the summation term in equations (4) and (5) are fixed by the structure of the waveguide 214, and therefore only the summation term depends on the wavenumber k. At this point, there are two alternative approaches—either (i) combining the broadband Green's function with a Foldy-Lax approach at 205, or (ii) combining the broadband Green's function with MoM at 207.

At 205, the broadband wall Green's function $g_W(k, \bar{\rho}, \bar{\rho}')$ is used to compute wall reflection coefficients $X_W$, according to:

$$X_w = \frac{1}{2\pi k J_n(k R_2)} \quad (6)$$

-continued $$\int_0^{2\pi} d\phi_{\overline{p}\overline{p}_q} e^{jm\phi_{\overline{p}\overline{p}_q}} \frac{4jk}{2\pi k J_m(kR_1)} \int_0^{2\pi} d\phi_{\overline{p'}\overline{p}_p} e^{-jm\phi_{\overline{p'}\overline{p}_p}} g_W(k,\overline{p},\overline{p'})$$

The wall reflection coefficients, $X_W$, couple the $m^{th}$ cylindrical outgoing wave from via 222, that is reflected from the wall of the waveguide 214, to the $n^{th}$ cylindrical incoming wave incident at the via 224. The two surface integrals $$\int_0^{2\pi} d\phi_{\overline{p}\overline{p}_q} \text{ and } \int_0^{2\pi} d\phi_{\overline{p'}\overline{p}_p}$$

in equation (6) are solved numerically. In the computations, the radii $R_1$ and $R_2$ can be larger than or equal to the via radii, $a_p$ and $a_q$, respectively. The circles of radii $R_1$ and $R_2$ are used to compute the wall reflection coefficients $X_W$. The Foldy Lax multiple scattering equations are solved with these additional contributions from the wall reflection coefficients.

At 206, surface currents on all the vias for the lowest waveguide modes are computed from the scattered fields. According to conventional models, the MoM typically uses the free space Green's function to solve the surface integral equation at the walls. The surface integral equation needs to be solved for each wavenumber k, within a range of interest, to compute the resulting Green's functions. Whereas, using the present method of low wavenumber extraction to the modal summation, the MoM needs only to be applied to the single wavenumber $k_L$. The solution at an arbitrary wavenumber k has a significant reduction in the number of unknowns.

At 207, alternatively, the broadband Green's function can be combined with the MoM instead of the Foldy-Lax equation to yield a solution that includes wall reflections. In this approach, Dirichlet boundary conditions are used on the surfaces of the vias, and the Helmholtz wave equation (1) is solved, assuming an incident $\psi_{inc}(k,\overline{p})$ from the antipads of the vias. Using the broadband Green's functions, the surface integral equation becomes $$\int_{\sigma_v} dl'[g(k,\overline{p},\overline{p'})J(\overline{p'})] = \psi_{inc}(k,\overline{p}) \quad (7)$$

wherein $\int_{\sigma_v} dl'$ are surface integrals over the vias, namely 222 and 224. The surface currents $J(\overline{p'})$ are the unknowns in the surface integral equations. The broadband Green's function is used in the integral equation in (7) rather than the free space Green's function in the conventional MoM.

The wall Green's function $g_W(k,\overline{p},\overline{p'})$ in (7) satisfies $$\int_{\sigma_v} dl'[g_0(k,\overline{p},\overline{p'}) + g_W(k,\overline{p},\overline{p'})]J(\overline{p'}) = \psi_{inc}(k,\overline{p}) \quad (8)$$

wherein $\overline{p}$ is a point on the surface of a vias. The surface integral equations can be solved by the MoM. The unknown surface currants $J(\overline{p'})$ are only on the surfaces of the vias because the wall effects have been included in the wall Green's function $g_W(k,\overline{p},\overline{p'})$. Thus, the surface currents $J(\overline{p'})$ on the vias are solved by either the broadband Green's function/Foldy Lax method, in steps 205-206, or the broadband Green's function/MoM method in step 207. The higher order waveguide modes are evanescent and do not reach the walls. The wall effects can be neglected in these higher order waveguide modes.

At 208, surface currents of the higher order waveguide modes are computed by the Foldy Lax method.

At 209, after the currents of all waveguide modes are computed, scattering parameters of the vias are computed over a broad frequency range. These scattering parameters include wall effects.

Figure 6A:
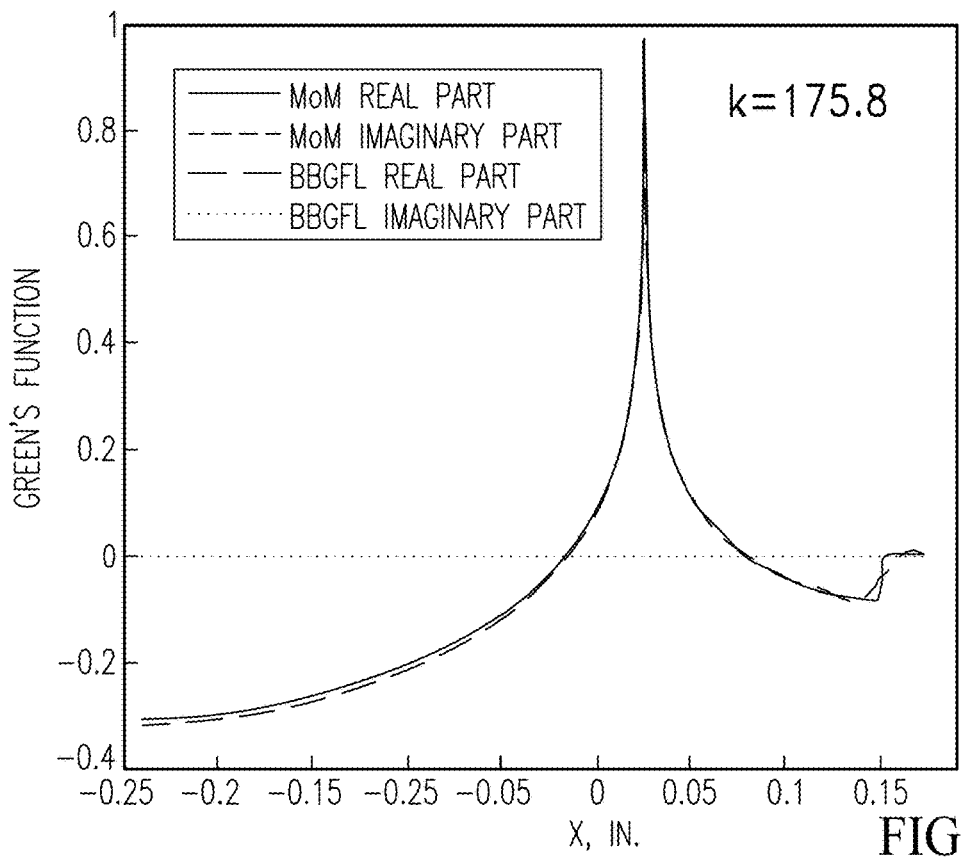
FIGS. 6A, 6B are plots of broadband Green's functions along a line computed using methods described herein, according to an embodiment.
Figure 6B:
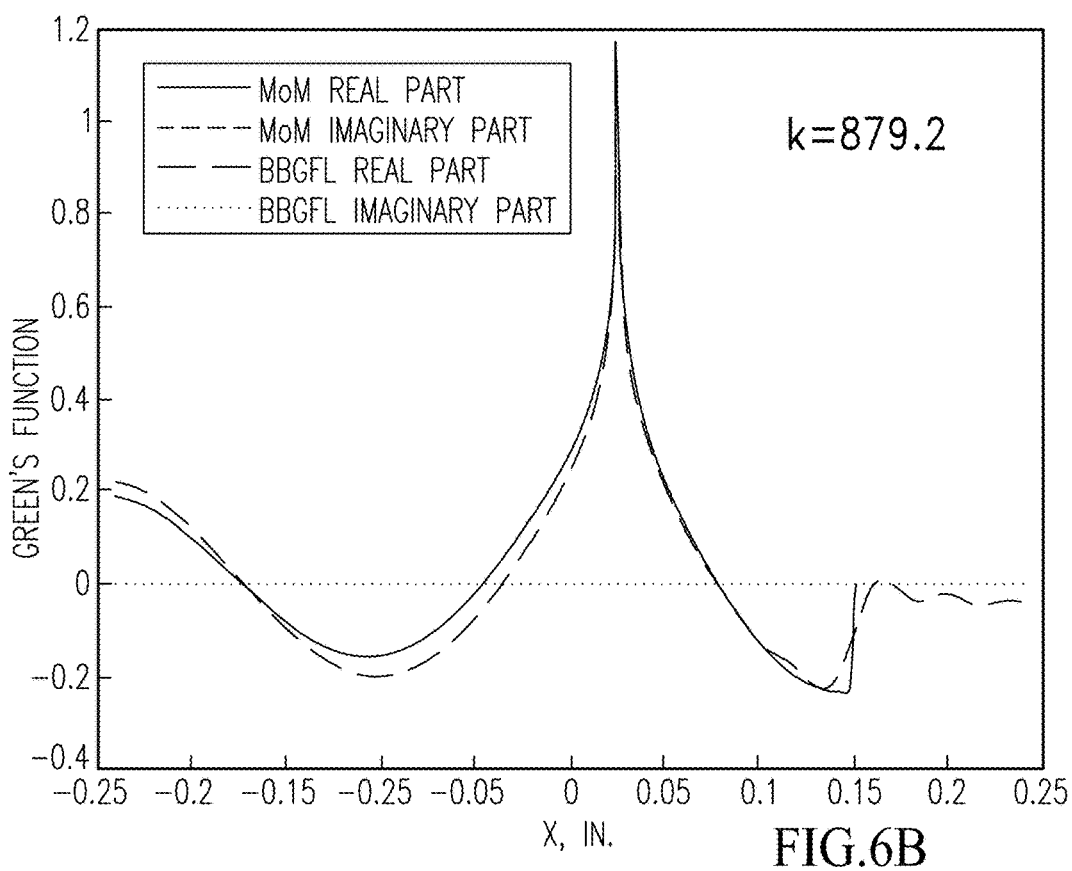

Comparisons of results of the present broadband Green's function method using low wavenumber extraction (BBGFL) and the conventional MoM are shown in FIGS. 6A and 6B and in Table III below. FIG. 6A compares Green's function values plotted along a line in the L-shaped waveguide for the Neumann boundary condition for k=175.8 for both the BBGFL and the MoM. FIG. 6B compares Green's function values for k=879.2 for both the BBGFL and the MoM. The comparisons in FIGS. 6A, 6B demonstrate that there is good agreement between the two methods for the wavenumbers k=175.8 and k=879.2, which represent extremes of a broad range of wavenumbers. The value used for low-wavenumber extraction in the result shown in FIGS. 6A, 6B is $k_L$=220, near the lower end of the range.

A comparison of computing times for MoM and the BBGFL method are given in Table I.

TABLE I

| | Comparison of CPU times | | | |
|---|---|---|---|---|
| Method of computation | 1 wavenumber | 10 wavenumbers | 100 wavenumbers | 1000 wavenumbers |
| BBGFL | 40.5 sec | 42.1 sec | 58.3 sec | 220.3 sec |
| MoM | 36.0 sec | 360.1 sec | 3601 sec | 36010 sec |

From Table I, one can appreciate that CPU times for a conventional MoM solution simply scale with the number of k-values used. Therefore, the CPU time required to perform a conventional MoM computation at 1000 different k-values is 1000 times longer than the CPU time required to perform the conventional MoM computation for a single wavenumber. However, using the technique of low wavenumber extraction on the broadband Green's function, the broadband solution is achieved in a time that is only about five times longer than is needed for the single wavenumber solution. Thus, for broadband modeling of the arbitrary-shaped waveguide using 1000 wavenumber points, the BBGFL method is about 163 times faster than the MoM.

When the BBGFL method is combined with the Foldy-Lax modeling approach, it is possible to compute scattering parameters, or S-parameters, for the L-shaped power/ground plane pair 216/218 described above. The S-parameters are used to characterize signal integrity. Four S-parameters are determined: insertion loss, return loss, near end crosstalk (NEXT), and far end crosstalk (FEXT). Insertion loss represents the loss of signal power resulting from insertion of the waveguide 214 into the signal path. Return loss is the loss of power due to reflection by the waveguide 214. Near end crosstalk represents interference of the transmitted signal caused by the waveguide 214. Far end crosstalk represents undesirable signal coupling between the transmitted and reflected signals. Existing methods for computing these S-parameters include the conventional MoM and a commercial antenna simulation tool, the high-frequency structural simulator (HFSS), available from Ansys, Inc. of Canonsburg, Pa. The conventional MoM solves, at every frequency, a surface integral equation with the free space Green's function for an arbitrary ground plane and vias. The HFSS computes the solution of the waveguide 214 using the finite element method at each frequency of interest.

Four examples of results obtained using the present BBGFL/Foldy-Lax method, compared with MoM, MoM/Foldy-Lax, and HFSS are provided by Huang, and by Tsang and Huang, for the cases of two signal vias with small cutouts, two signal vias with large cutouts, four vias including a pair of signal vias and a pair of shorting vias, and vias including four signal vias and four shorting vias. Signal vias are coupled to signal traces as shown in FIGS. 4A, 4B, whereas shorting vias provide a vertical path between points on two different layers. Two of these examples are presented herein: the case of a power/ground plane pair 216/218 having two signal vias 222, 224 and a small cutout 220 as shown in FIG. 3; and the power/ground plane pair 216/218 having eight vias and a large cutout 220, shown in FIG. 9. Data is presented in FIGS. 7A-7D and 8A-8D for the two-via case, and in FIGS. 10A-10D and 11A-11D for the eight-via case. Inputs to the simulation are as follows: relative permittivity $\varepsilon_r = 3.4(1-j0.02)$; Lx=Ly=500 mils; the radius a of the source vias is 6.75 mils; and the antipad radius b is 20 mils, wherein 1 mil is defined as 0.001 inch.

Example 1

Figure 7A:
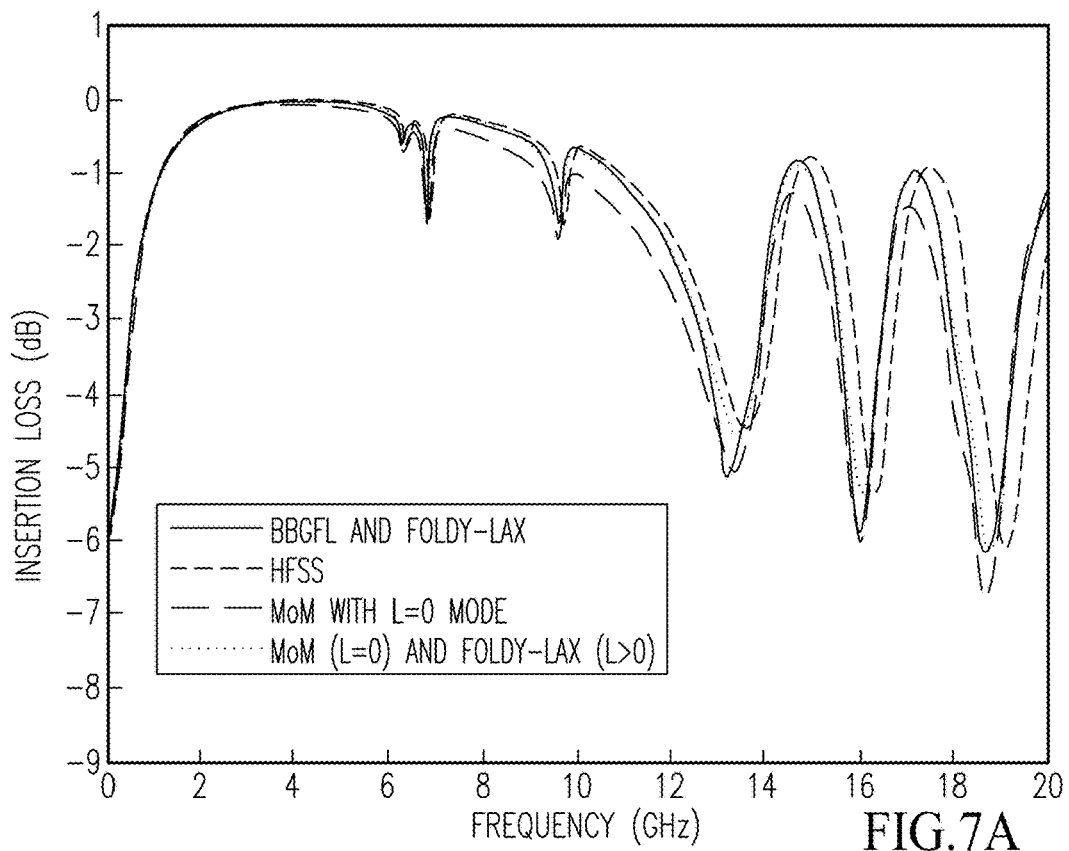
FIGS. 7A-7D show a broadband spectral analysis of scattering parameters produced by an embodiment of the inventive method described herein combined with a Foldy-Lax approach, compared with various known computational methods applied to the two-via PCB shown in FIG. 3.
Figure 7B:
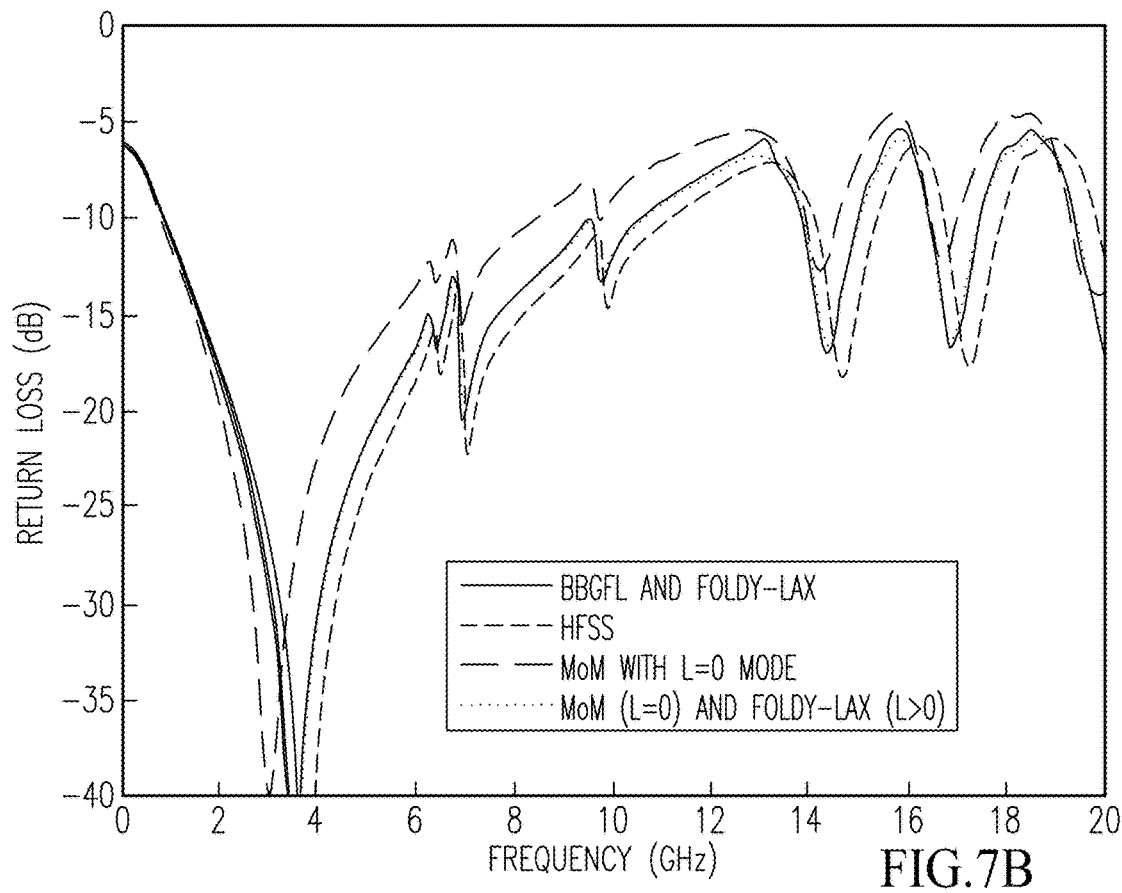
Figure 7C:
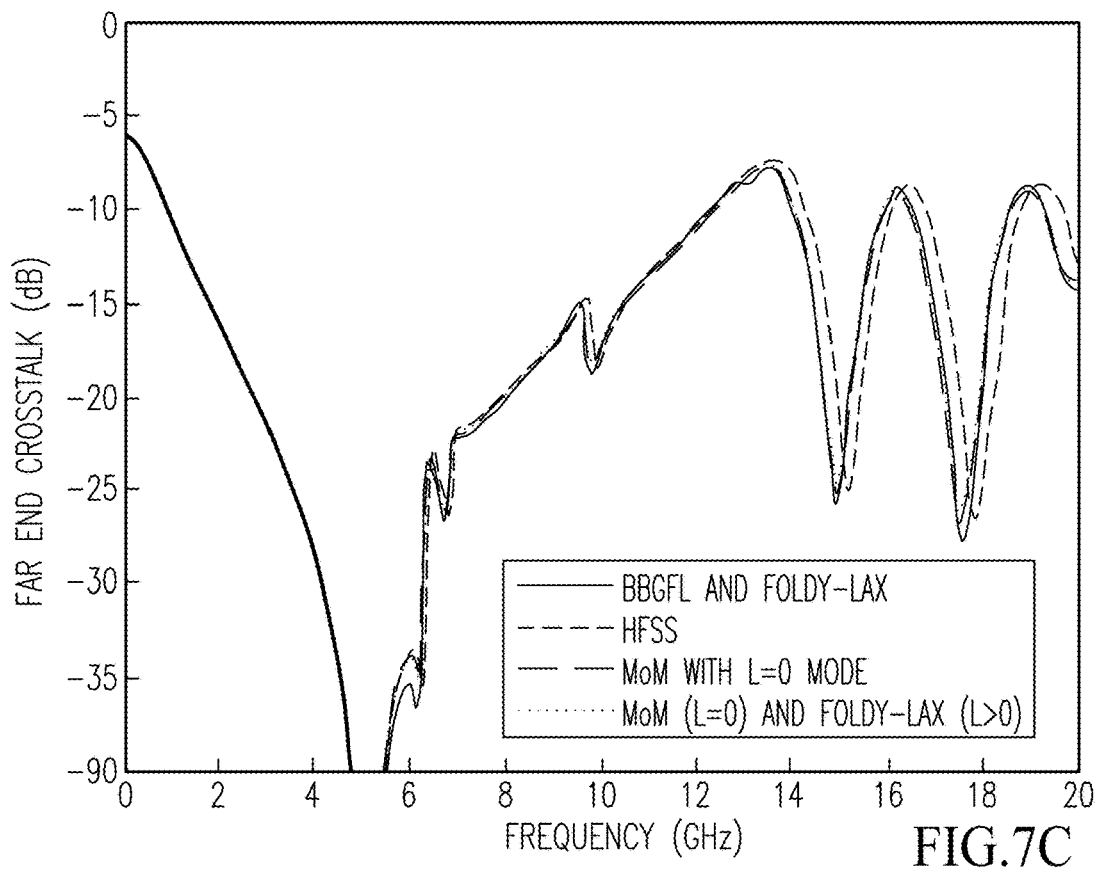
Figure 7D:
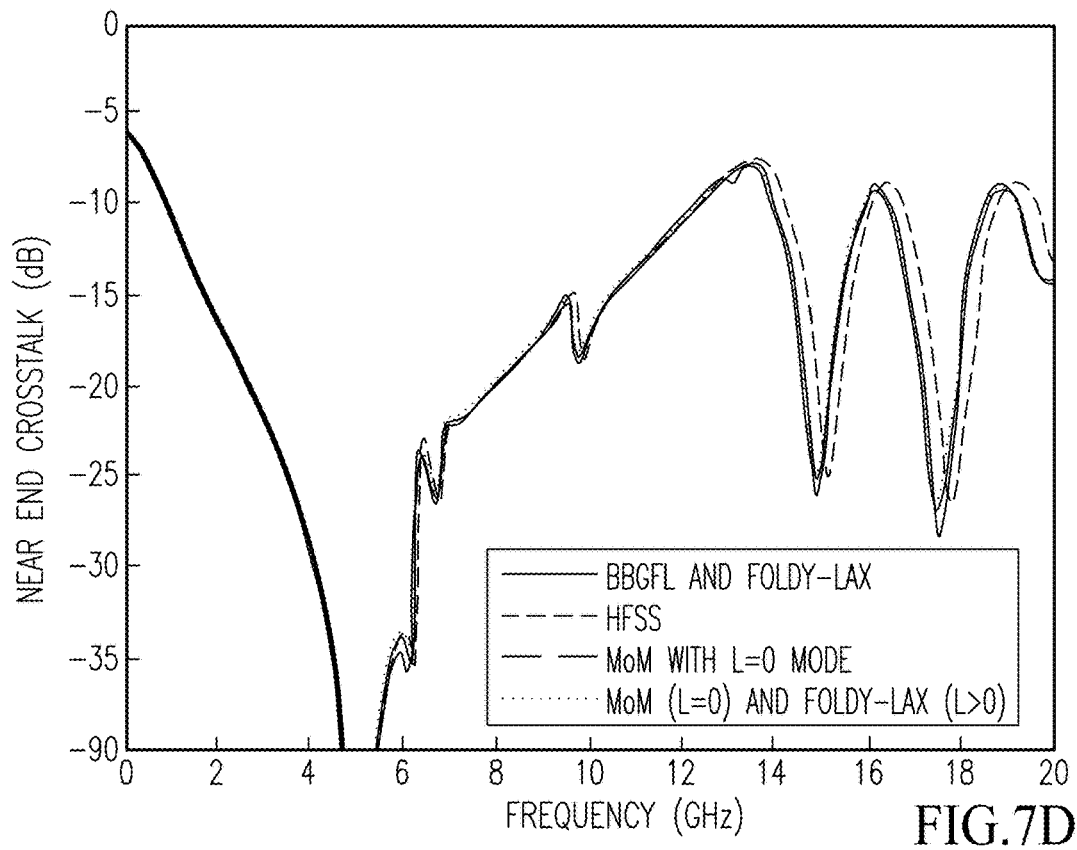
Figure 8A:
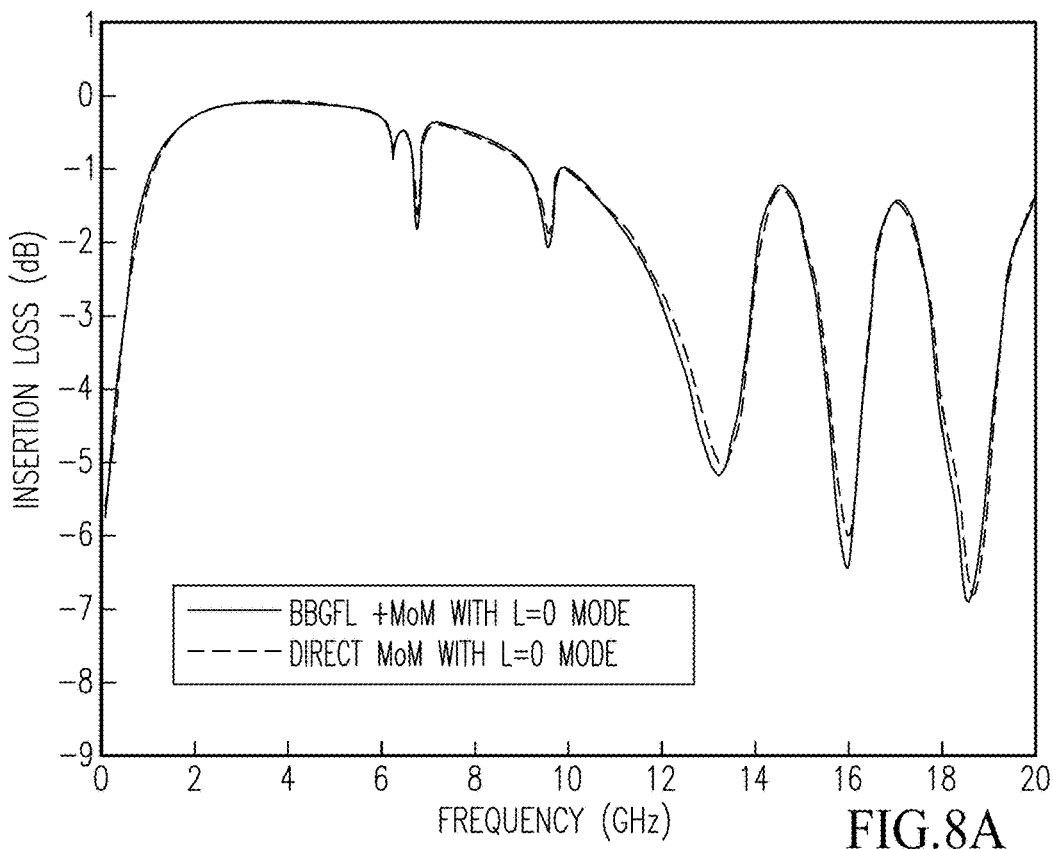
FIGS. 8A-8D show a broadband spectral analysis of scattering parameters produced by an embodiment of the inventive method described herein combined with a MoM approach, compared with the conventional MoM, based on a free space Green's function, applied to the two-via PCB shown in FIG. 3.
Figure 8B:
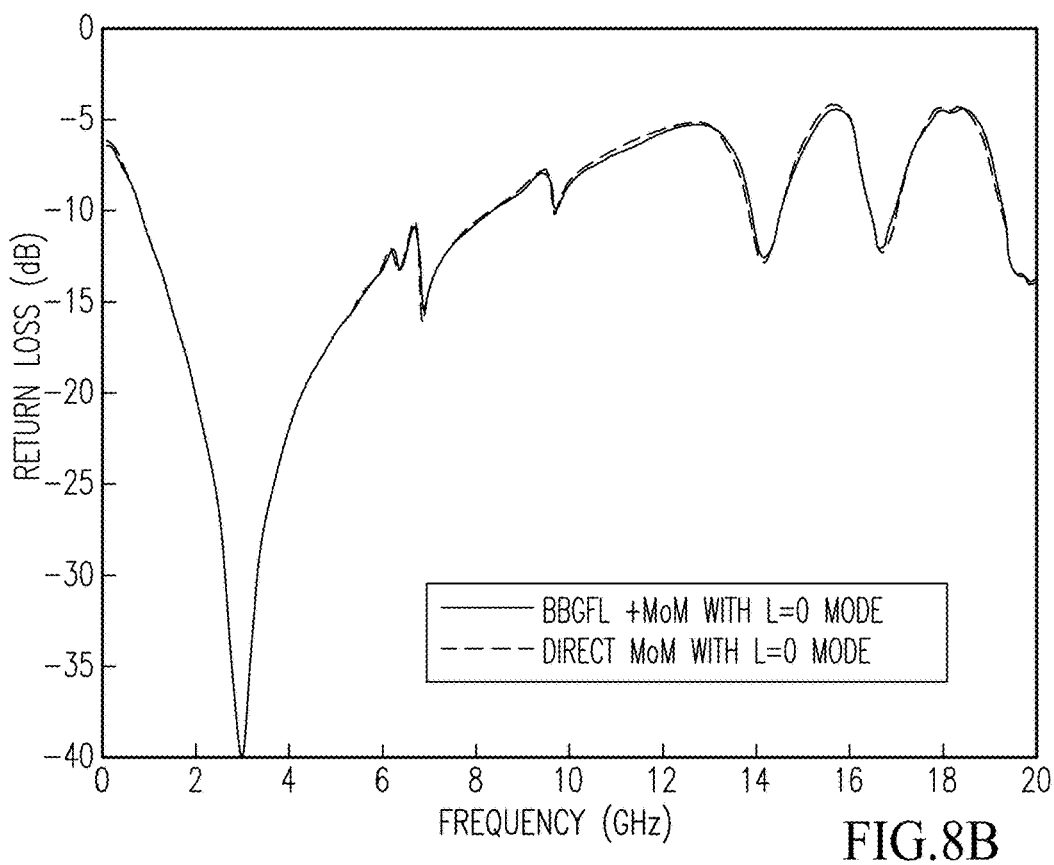
Figure 8C:
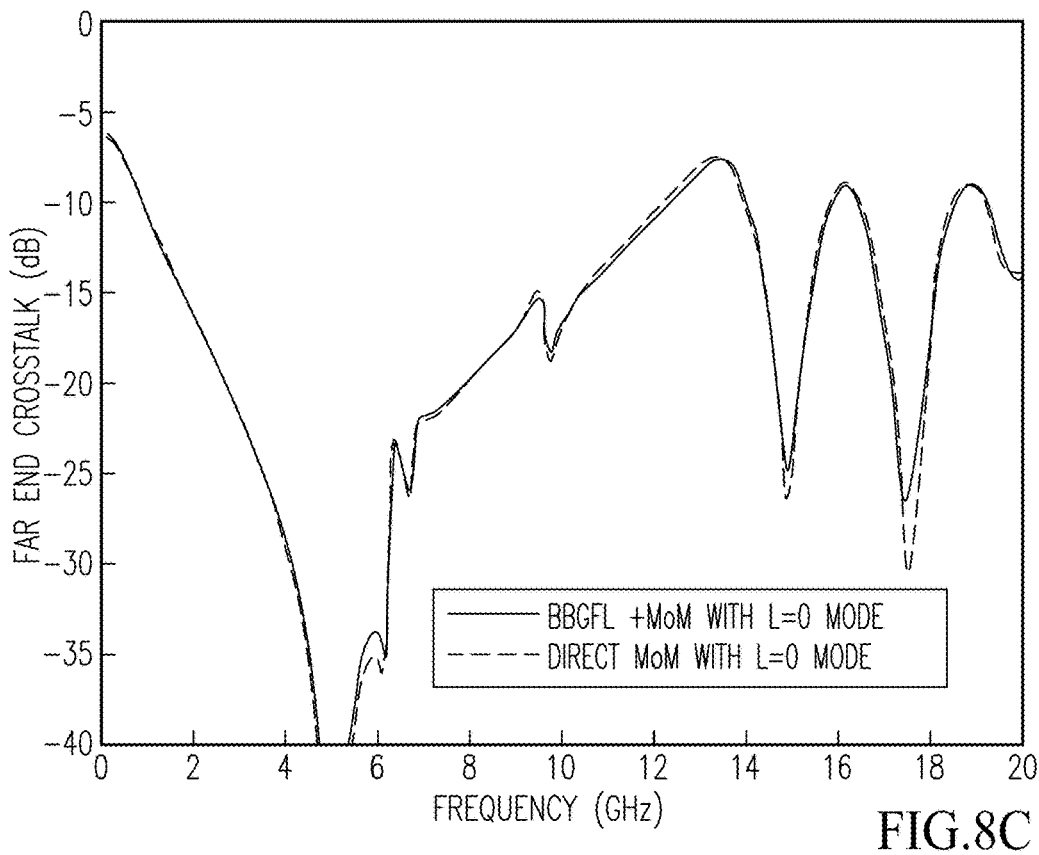
Figure 8D:
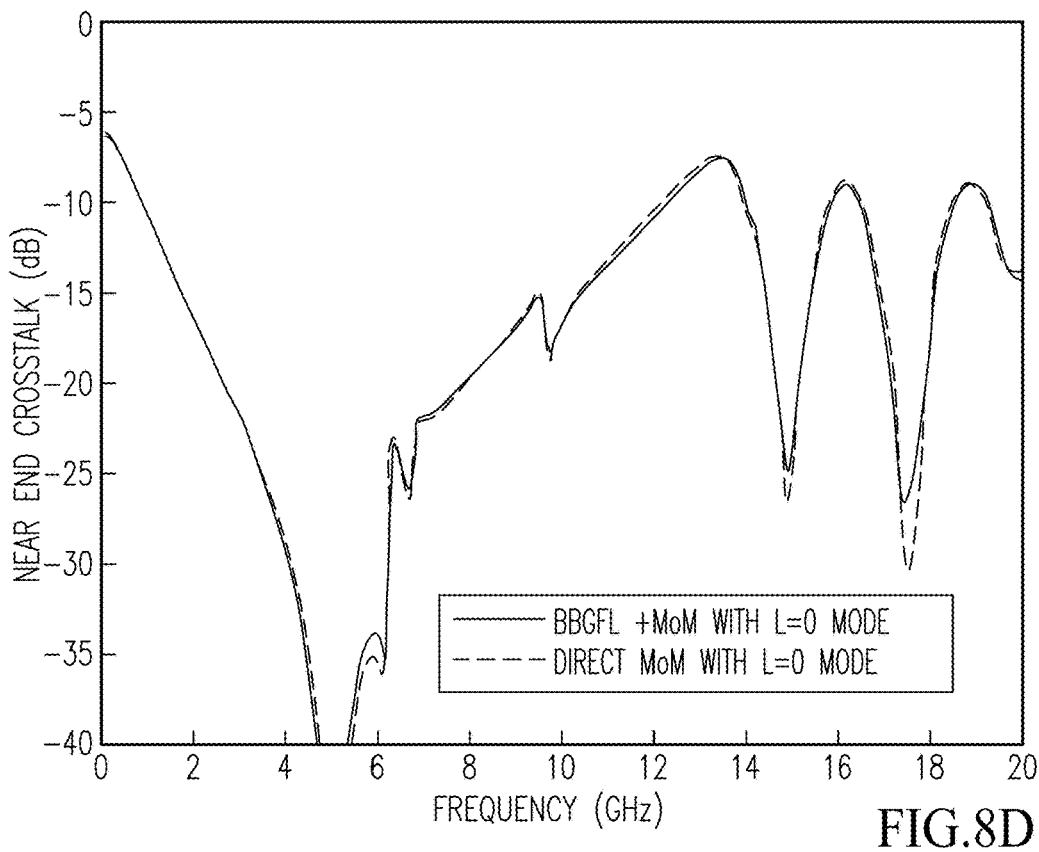

In the two-via example having a small cutout 220, L1=W1=100 mils, the two signal vias 222, 224 are located at (x,y) coordinates (−25, 0) and (25, 0) mils. FIGS. 7A-7D show plots of the S-parameters in dB over the frequency range 0-20 GHz obtained using the BBGFL/Foldy-Lax method at step 205, compared with other methods: FIG. 7A shows insertion loss; FIG. 7B shows return loss; FIG. 7C shows far end crosstalk; and FIG. 7D shows near end crosstalk. The results for all four S-parameters obtained using the BBGFL/Foldy-Lax method are in close agreement with those obtained by the MoM, MoM/Foldy-Lax approach, and the HFSS approach. All of the methods indicate the resonant frequencies (peaks), which are caused by reflections from the walls of the waveguide 214. FIGS. 8A-8D show plots of the S-parameters in dB over the frequency range 0-20 GHz obtained using the BBGFL/MoM compared with other methods. Again there is good agreement with the current methods. The results of the BBGFL therefore are comparable to the other methods, regardless of whether BBGFL is combined with the Foldy-Lax method or the MoM.

Example 2

Figure 9:
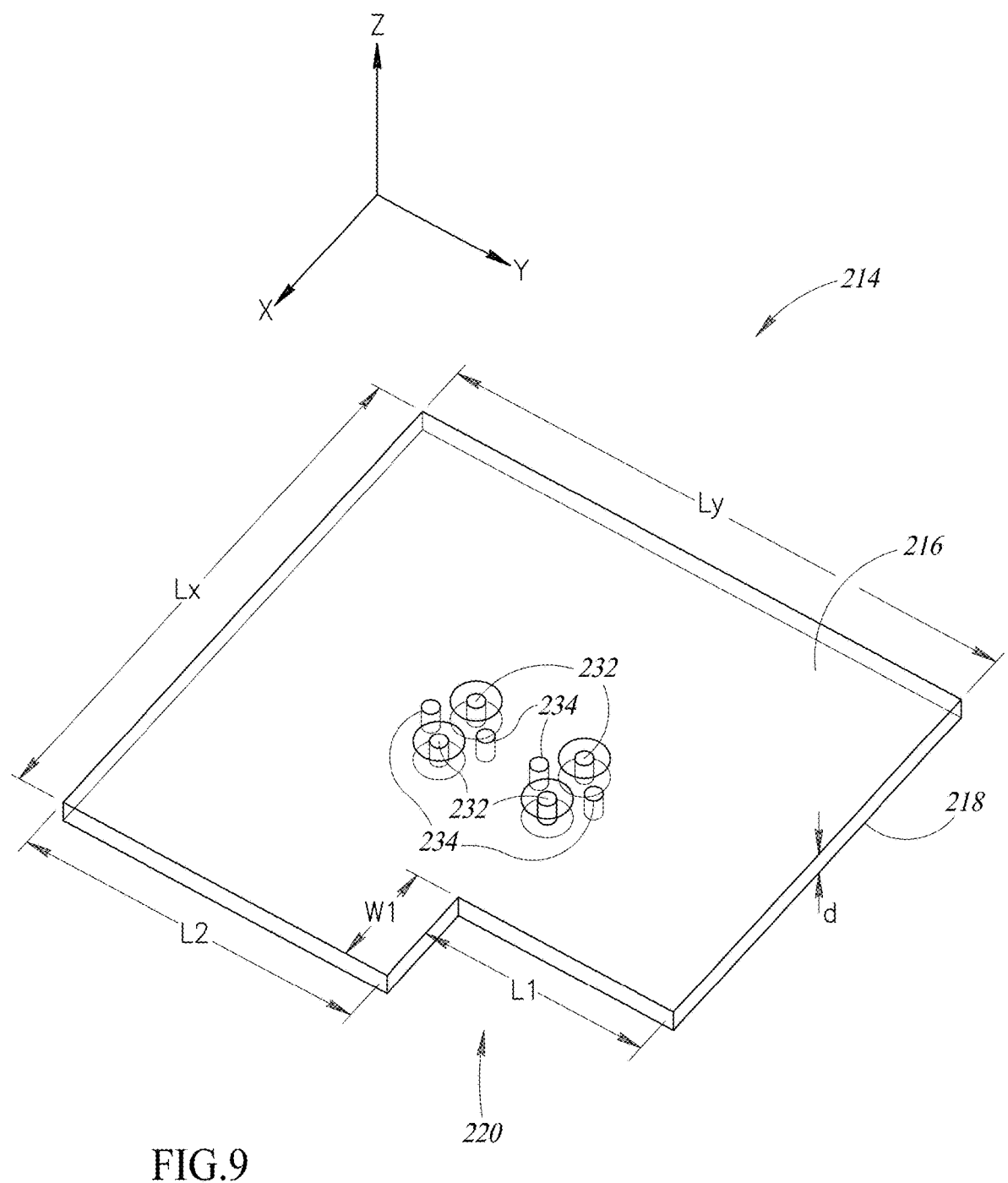
FIG. 9 is a perspective view of an exemplary printed circuit board having an arbitrary rectangular geometry with a large cutout and eight vias.
Figure 10A:
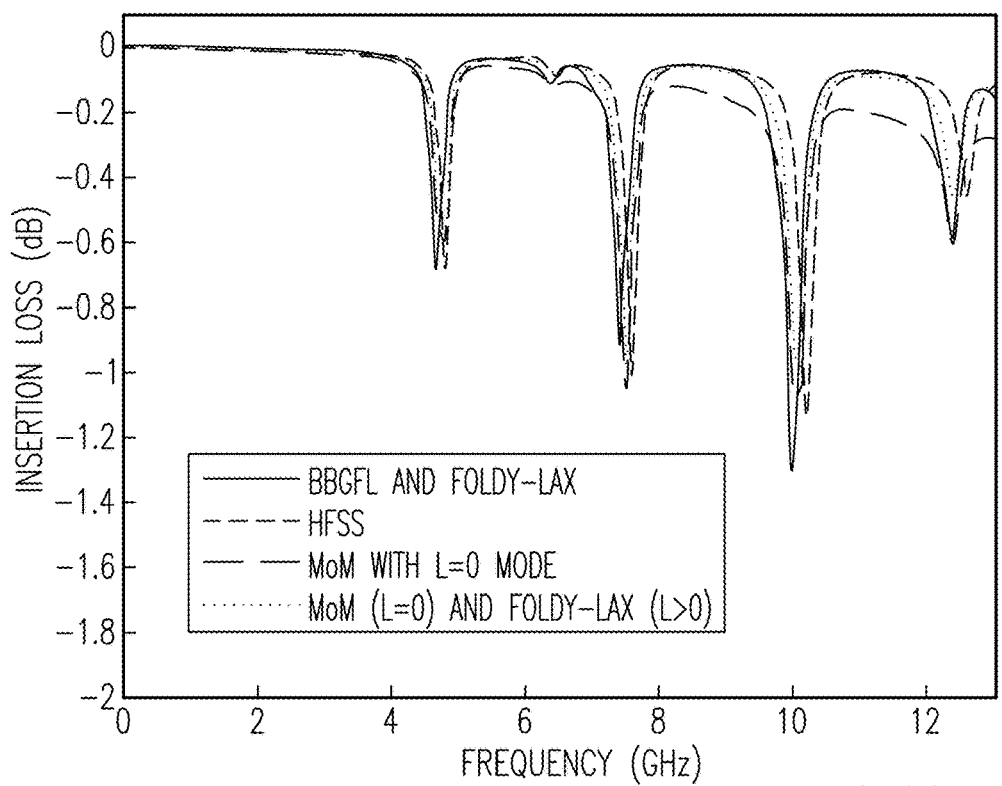
FIGS. 10A-10D show a broadband spectral analysis of scattering parameters for an embodiment of the inventive method described herein combined with a Foldy-Lax approach, compared with various known computational methods applied to the eight-via PCB shown in FIG. 9.
Figure 10B:
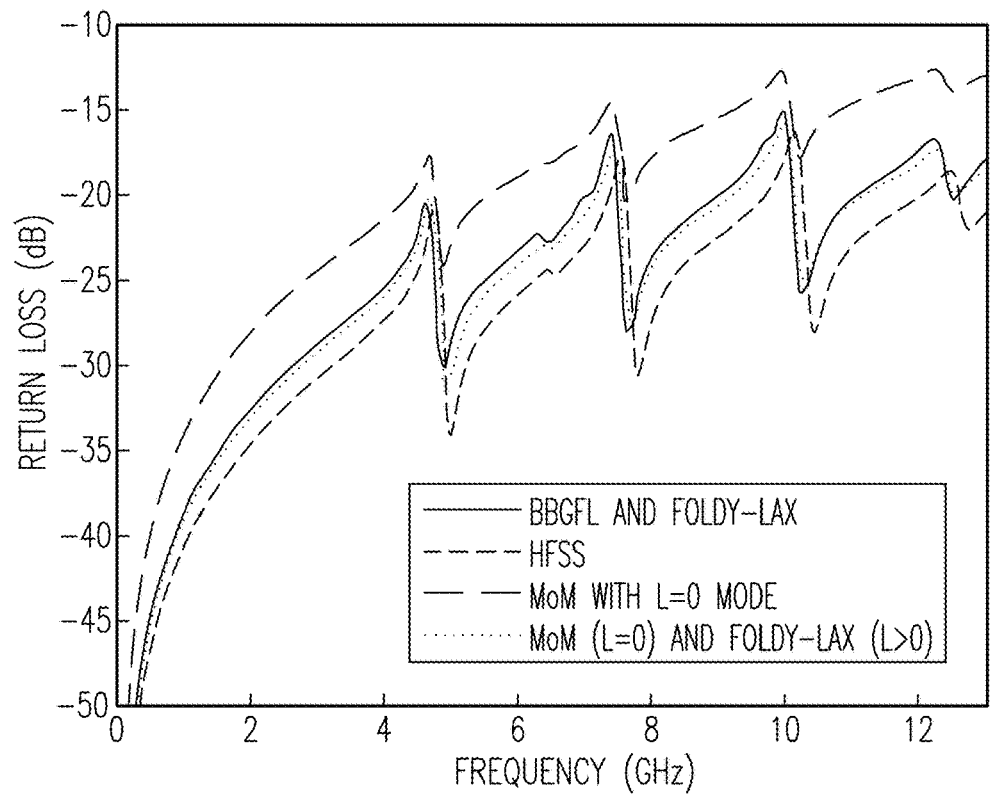
Figure 10C:
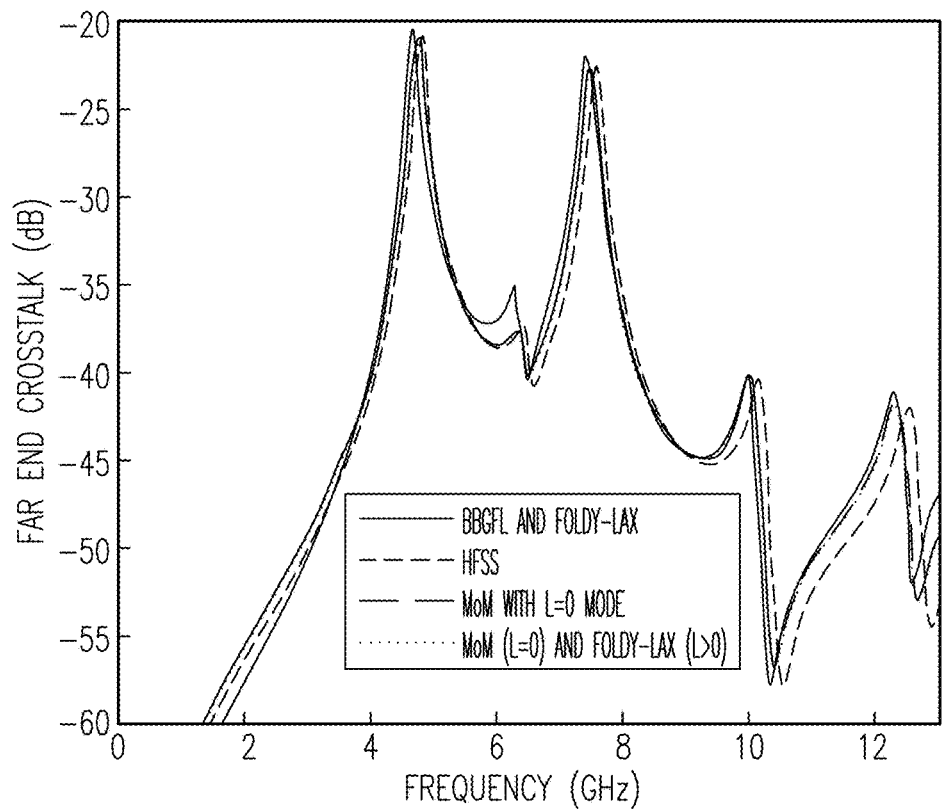
Figure 10D:
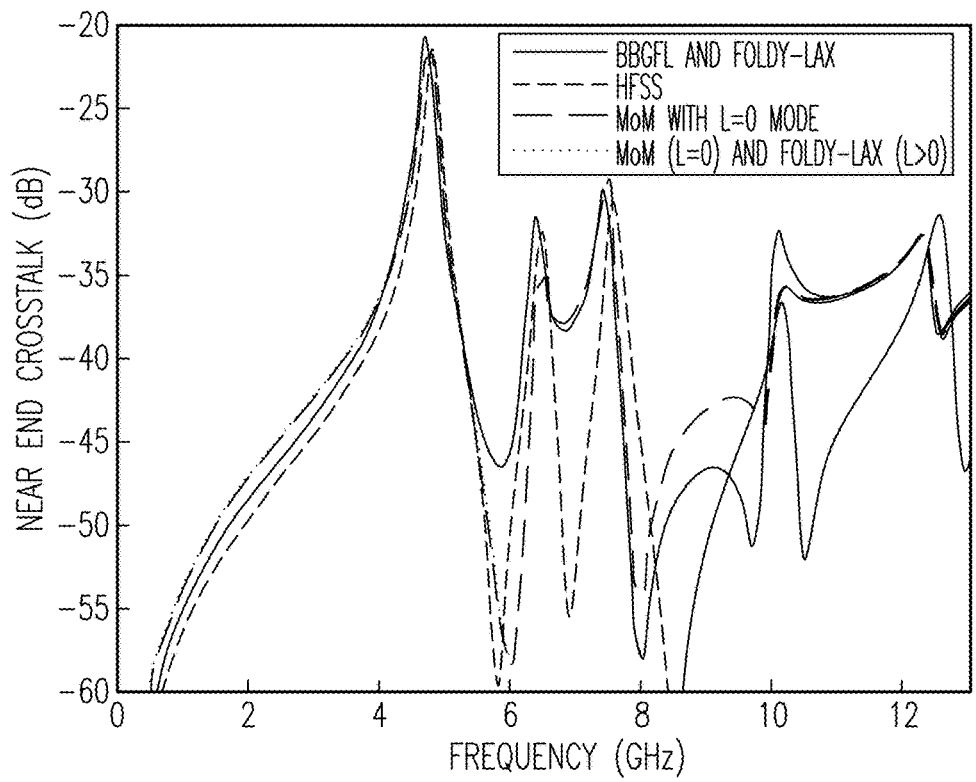
Figure 11A:
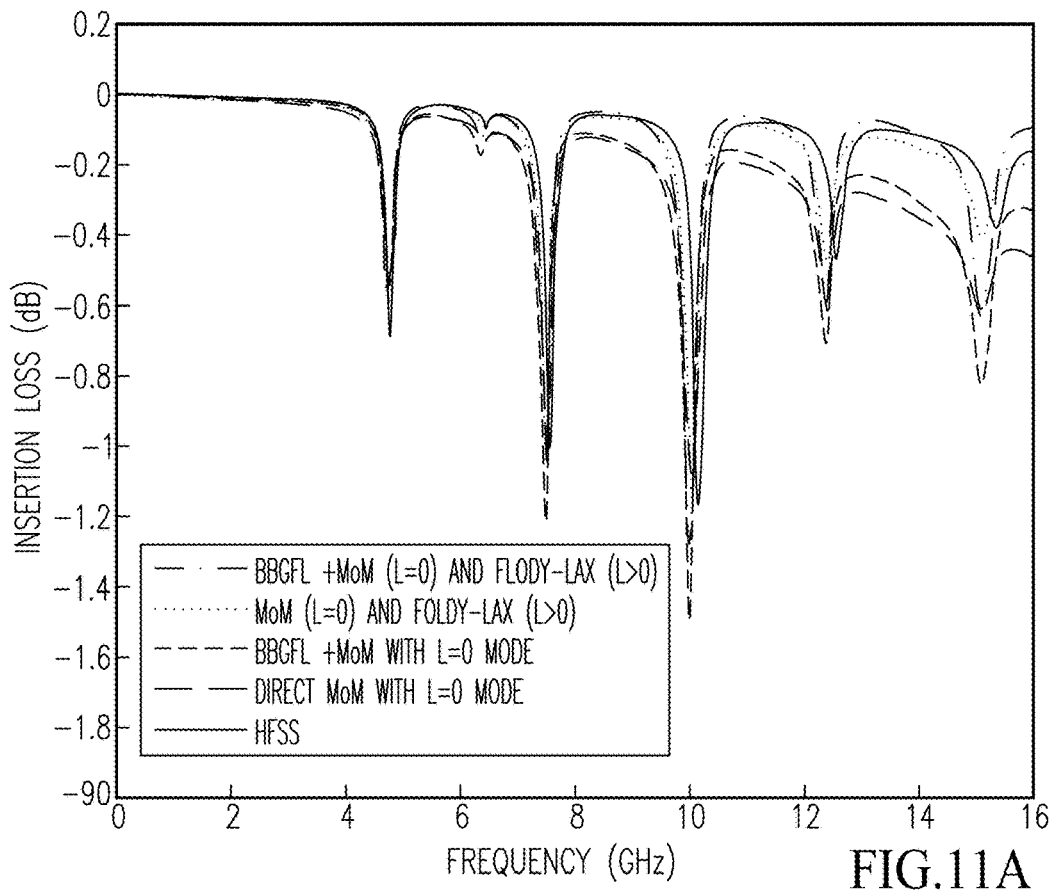
FIGS. 11A-11D show a broadband spectral analysis of scattering parameters for an embodiment of the inventive Broadband Green's Function method described herein combined with a MoM approach, and combined with both Foldy-Lax and MoM, compared with various known computational methods applied to the eight-via PCB shown in FIG. 9.
Figure 11B:
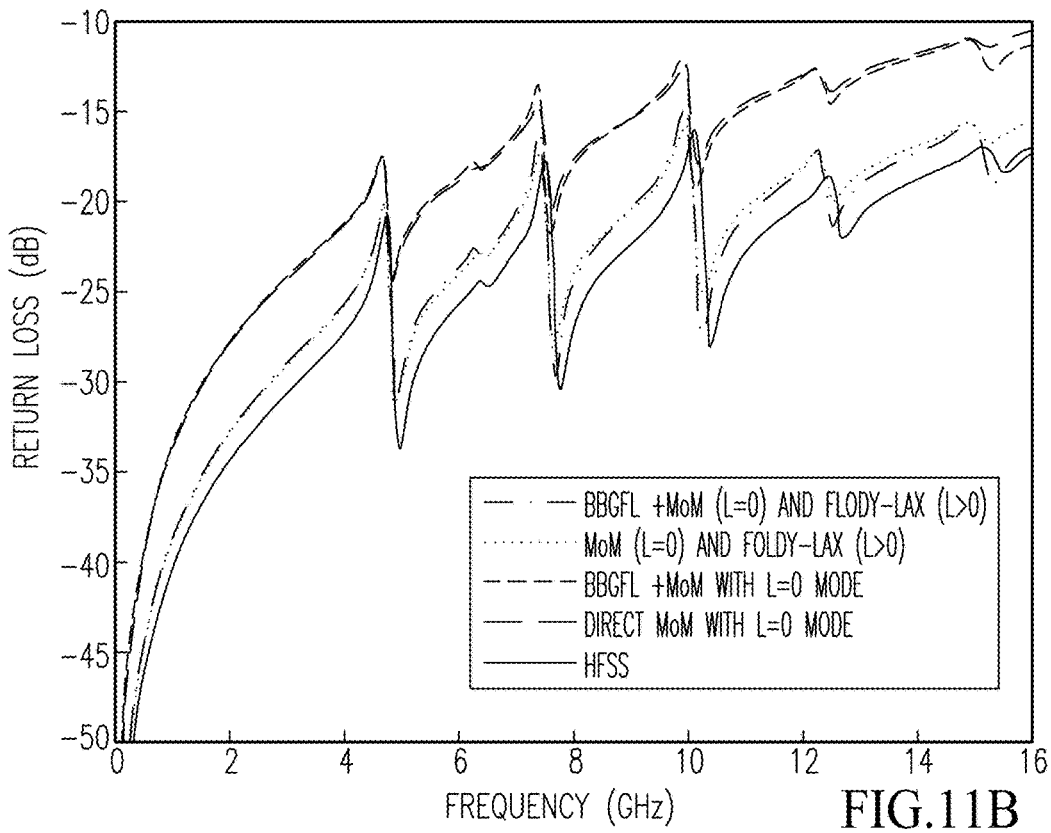
Figure 11C:
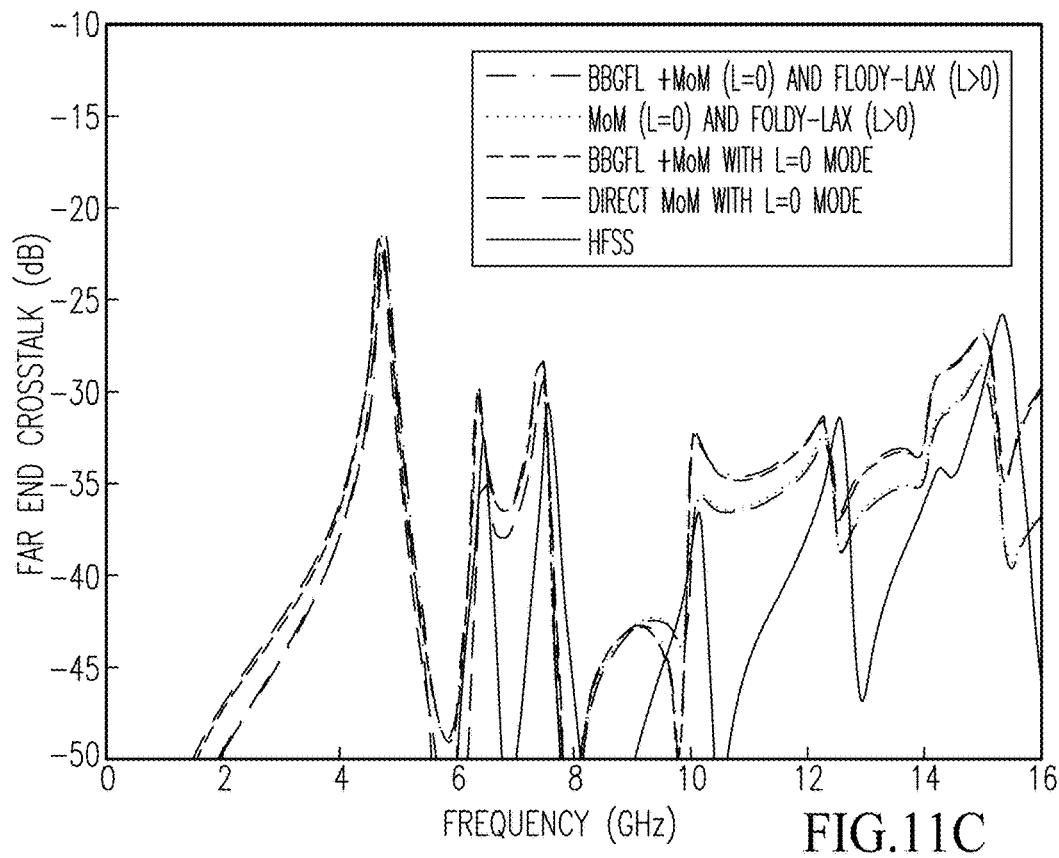
Figure 11D:
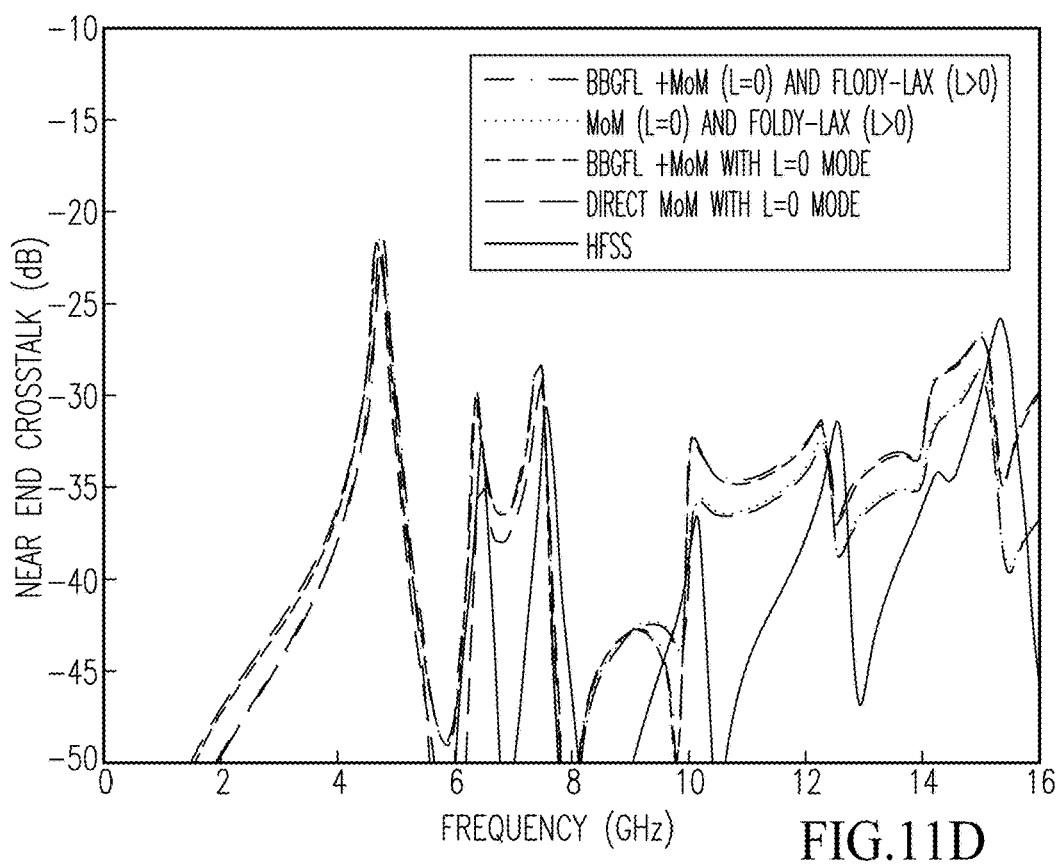

The waveguide 214 has a large cutout 220 of dimension L1=200 mils×W1=100 mils. FIG. 9 shows the locations of the eight vias with respect to the waveguide 214. Four signal vias 232 are located at (−25, 50), (25, 50), (−25, −50), and (25, −50) mils; and four shorting vias 234 are located along the y-axis in pairs that are centered on the mid-points (0, −25), and (0, 25) between the signal vias 232. Results obtained using the BBGFL/Foldy-Lax approach are compared with results from other methods, in FIGS. 10A-10D. FIG. 10A shows insertion loss; FIG. 10B shows return loss; FIG. 10C shows far end crosstalk; and FIG. 10D shows near end crosstalk. Again, the results for all four S-parameters are in close agreement with those obtained by the MoM/Foldy-Lax approach, and the HFSS approach. Corresponding results obtained using the BBGFL/MoM approach are compared with results from other methods in FIGS. 11A-11D.

For the intermediate case of four vias at 1000 frequency points, the present BBGFL/Foldy-Lax method executes in 11.7 sec, while the MoM takes 3200 sec and the HFSS takes 5235 sec to run. Thus, the present method is more than 250 times faster than MoM and about 450 times faster than HFSS, while producing results that are in good agreement with these conventional methods.

The simulation examples described above, including the four-via case, were run using the BBGFL/MoM combined approach with similar results to the BBGFL/Foldy-Lax combined approach. Furthermore, the same simulation examples given above have been run using the BBGFL method combined with both the MoM and Foldy-Lax, also with similar results. The CPU speeds for these combined approaches are consistent with those obtained using the BBGFL/Foldy-Lax combined approach.

Turning again to FIGS. 2 and 4B, instead of, or in addition to, evaluating signal integrity at 210 by computing scattering parameters of vias including wall effects, it is also possible to use the BBGFL approach to analyze emissions from the PCB itself in the form of wave modes that propagate out from the PCB and are not contained within the waveguide 214. A PCB structure that can create the most radiated emissions and can cause failure of an EMC certification test is the power distribution network (PDN), or power bus. The BBGFL method presented herein is therefore further applied to the problem of modeling emissions of the PDN, by carrying out steps 211-213a. Either the approach of 205-206 that combines BBGFL with Foldy Lax, or the approach of 207 that combines BBGFL with MoM can be applied to steps 211-213a.

Figure 12:
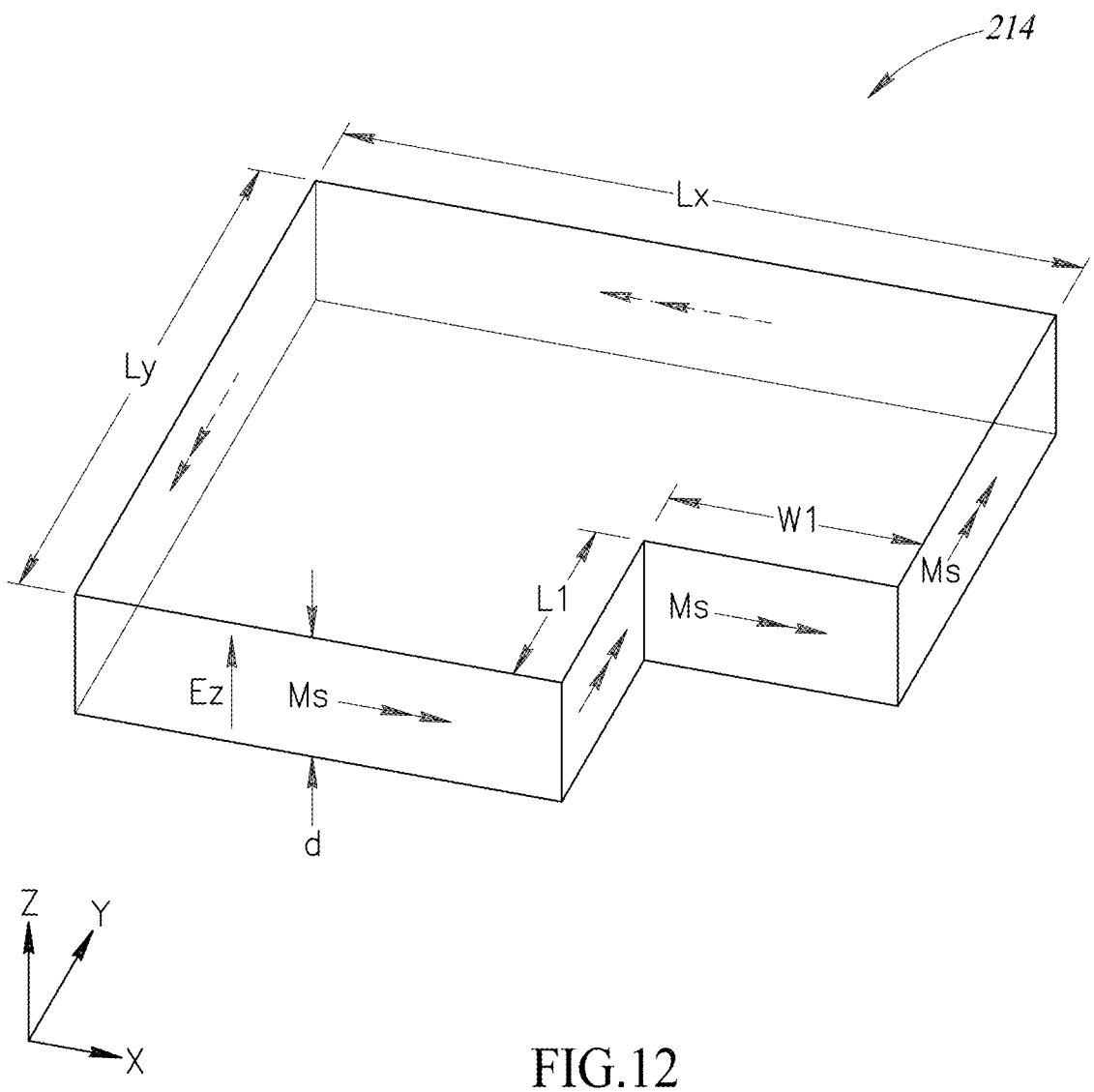
FIG. 12 is a perspective view of an exemplary PCB having an arbitrary rectangular geometry, for use in a simulation of radiated emission, according to one embodiment described herein.

The thickness of a typical PCB is much smaller than the wavelengths of interest. Furthermore, the induced surface fields on the outer surfaces of the PCB are much smaller than the induced surface fields on the inner surfaces of the PCB. For these reasons, the emissions of the outer top and bottom surfaces can be assumed to cancel each other. At steps 211 and 212, the via surface currents of the lowest waveguide mode and the broadband Green's functions are used to calculate the tangential electric fields on the sidewalls of the waveguide 214. The tangential electric fields on the walls can be thought of as magnetic surface currents $\overline{M}_S(\overline{\rho}')$ as shown in FIG. 12. Because the PCB is so thin, only the lowest waveguide mode emitted by the via 222 propagates to the walls of the waveguide.

At 211, the radiated field $E(\theta, \phi)$ as a function of the scattering angle $\theta$ and the azimuthal angle $\phi$ is calculated from the tangential electric fields on the sidewalls of the waveguide 214.

At 212, the equivalent magnetic surface currents and the free space Green's function of air are used to calculate the radiated electric field. In the far field approximation ($\overline{r} \gg \overline{r}'$), the angular components of the radiated electric field are expressed in terms of the Green's function $g(k, \overline{\rho}, \overline{\rho}'')$, wherein $\overline{\rho}''$ is the location of the via 222 and $k = k_0\sqrt{\varepsilon_r}$:

$$E_\phi = -j\frac{k_0 d}{4\pi}\frac{e^{-jk_0 r}}{r}\cos\theta \qquad (9)$$
$$\int_C g(k, \overline{\rho}, \overline{\rho}'')(\cos\phi\tau'_x dx' + \sin\phi\tau'_y dy')e^{jk_0(x'\sin\theta\cos\phi + y'\sin\theta\sin\phi)}$$

$$E_\theta = -j\frac{k_0 d}{4\pi}\frac{e^{-jk_0 r}}{r} \qquad (10)$$
$$\int_C g(k, \overline{\rho}, \overline{\rho}'')(-\sin\phi\tau'_x dx' + \cos\phi\tau'_y dy')e^{jk_0(x'\sin\theta\cos\phi + y'\sin\theta\sin\phi)}$$

wherein the absolute value is $|E|=\text{sqrt}(|E_\phi|^2+|E_\theta|^2)$.

At 213b, spectral results obtained using the BBGFL method can be communicated to the EMC computing system 134 and the Design Automation Computing System 136 via the network 132, for use in modifying circuit designs on PCBs, and/or for use in modifying interconnects, via layouts, power delivery, board geometries, and other features of the PCBs themselves.

Six examples of results obtained using the present BBGFL method compared with MoM and HFSS are provided by Huang for the following cases shown in Table II:

TABLE II

Simulated PCB Radiated Emissions

| Case | Lx, in. | Ly, in. | W1, in. | L1, in. |
|---|---|---|---|---|
| A* | 0.5 | 0.5 | 0.125 | 0.35 |
| B | 1.5 | 1.5 | 0.125 | 0.35 |
| C | 5 | 5 | 0.125 | 0.35 |
| D* | 5 | 5 | 1.25 | 3.5 |
| E | 0.5 | 0.5 | 0.1 | 0.1 |
| F | 1.0 | 1.0 | 0.125 | 0.35 |

Cases A and D are presented herein as examples, with simulation results shown in FIGS. 13A-14G. The example cases have been chosen to show a variety of different geometries: case A is that of a small square waveguide having a small rectangular cutout, with results shown in FIGS. 13A-13G; case D is that of a large square waveguide having a large rectangular cutout, with results shown in FIGS. 14A-14G.

Inputs to the simulation are as follows: relative permittivity $\varepsilon_r=4.4(1-j0.02)$; d=20 mils; source location coordinates $\bar{\rho}''=(-25,0)$ mils relative to the center of the waveguide 214; observer coordinates $\bar{\rho}'=(0.1L_x, -0.5L_y)$, over a range of 100 frequencies between 1 GHz and 10 GHz.

Figure 13A:
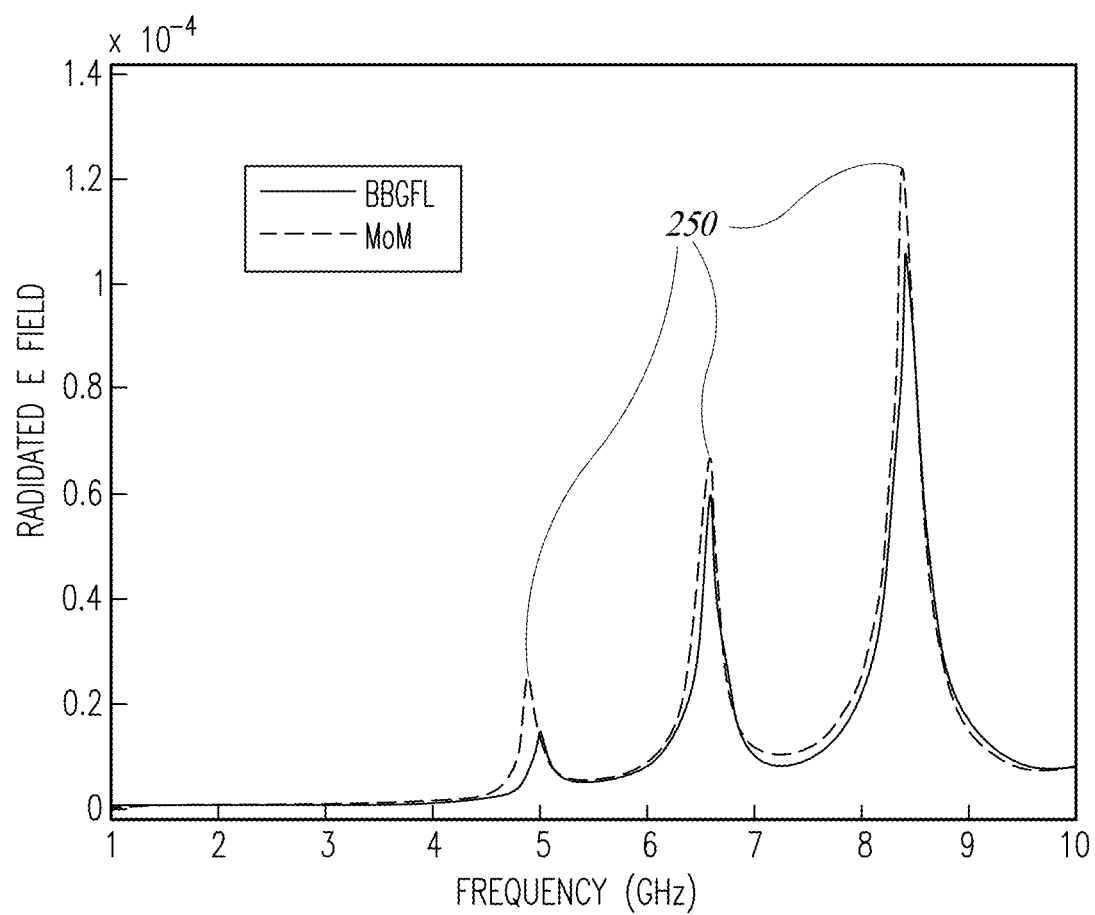
FIG. 13A is a spectral plot of electric fields radiated by a first exemplary power/ground plane pair, according to an embodiment as described herein.
Figures 13B, 13C, 13D:
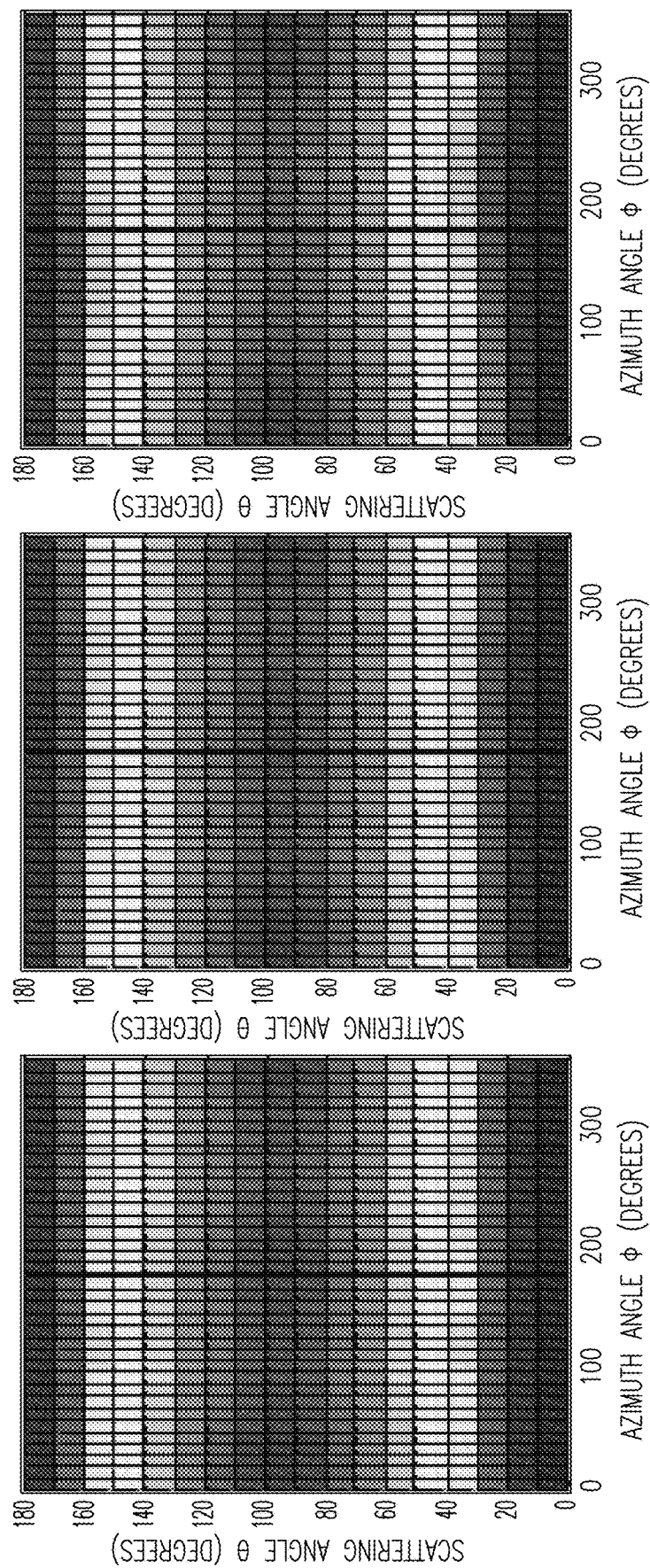
FIGS. 13B-13D are angular maps of electric fields radiated by the first exemplary power/ground plane pair at 2 GHz, according to an embodiment as described herein.

The results for case A are shown in FIGS. 13A-13G. FIG. 13A is a plot of the radiated electric field as a function of frequency, in the far field. Resonance peaks 250 are evident at about 5.0 GHz, 6.5 GHz, and 8.5 GHz, using either the BBGFL or MoM. FIGS. 13B-13D show comparison simulation data for the radiated electric field $E(\theta, \phi)$ computed according to MoM, BBGFL, and HFSS methods, respectively, at a frequency of 2 GHz. FIGS. 13E-13G show comparison simulation data for the radiated electric field $E(\theta, \phi)$ computed according to MoM, BBGFL, and HFSS methods, respectively, at a frequency of 10 GHz. All of the electric field data shows good agreement between the three methods; however, for case A, the BBGFL method matches the MoM somewhat closer than the HFSS method.

Figure 14A:
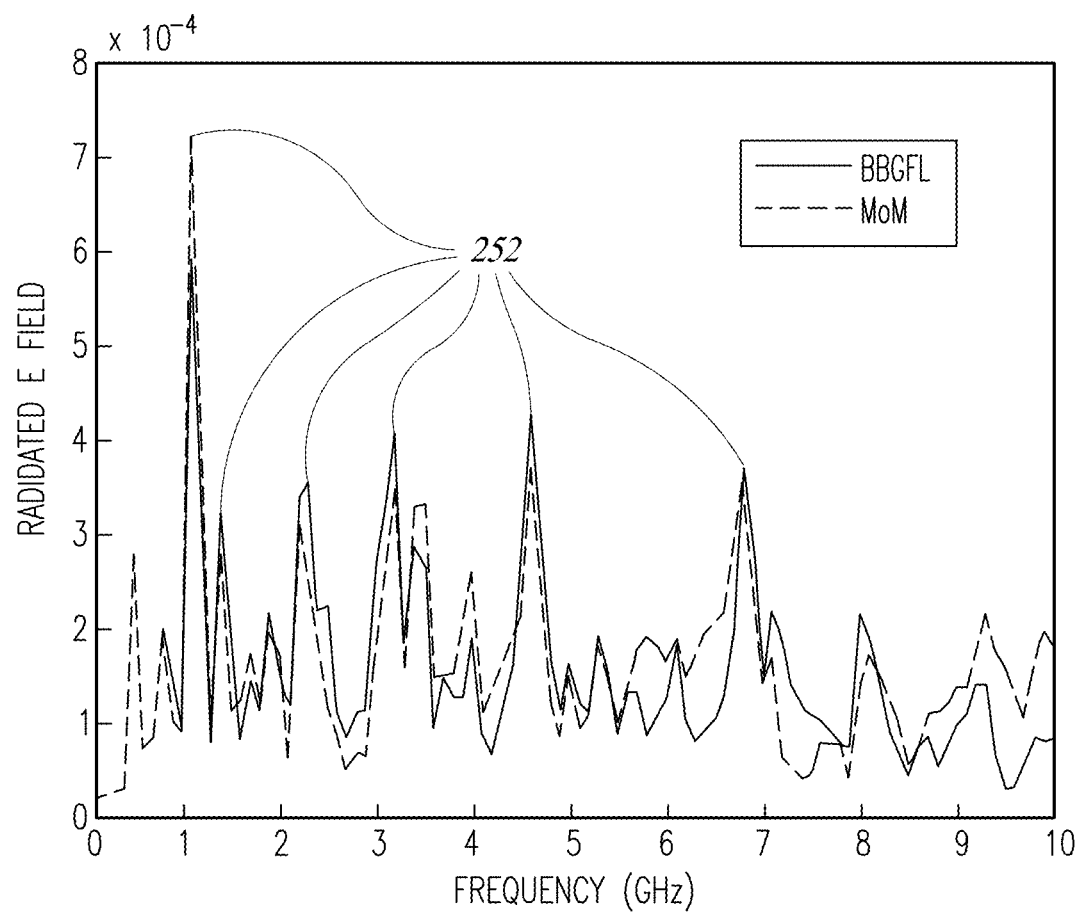
FIG. 14A is a spectral plot of electric fields radiated by a second exemplary power/ground plane pair, according to an embodiment as described herein.

The results for case D are shown in FIGS. 14A-14G. FIG. 14A is a plot of the radiated electric field as a function of frequency, in the far field. Many resonance peaks 252 are evident using either the BBGFL method or MoM, in which at least the most prominent resonances coincide well with one another. FIGS. 14B-14D show comparison data for the radiated electric field $E(\theta, \phi)$ at a frequency of 2 GHz. FIGS. 14E-14G show comparison data for the radiated electric field $E(\theta, \phi)$ at a frequency of 10 GHz. All of the electric field data shows good agreement between the three methods.

For the example of case A, the present BBGFL/Foldy-Lax method computes radiated emissions from the PCB at 100 frequency points in 2.47 sec, while the MoM takes 127 sec and the HFSS takes 255 sec to run. Thus, the present method is more than 50 times faster than MoM and more than 100 times faster than HFSS, while producing results that are in good agreement with these conventional methods. The other examples show similar improvements in computational efficiency.

It will be appreciated that, although specific embodiments of the present disclosure are described herein for purposes of illustration, various modifications may be made without departing from the spirit and scope of the present disclosure. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. Aspects of the embodiments can be modified, if necessary, to employ concepts of the various patents, applications and publications to provide yet further embodiments.

The invention claimed is:

1. A system, comprising:
    a non-transitory processor-readable memory that stores computer instructions; and
    a microprocessor that is communicatively coupled to the non-transitory processor-readable memory and that performs actions when executing the computer instructions, the actions including:
        receiving a description of a geometry of a printed circuit board that includes vias and structures that act as a waveguide;
        determining broadband Green's functions for the waveguide;
        determining reflection coefficients from the broadband Green's functions for the waveguide;
        determining scattered electric fields from the reflection coefficients;
        determining electric currents on each of the vias based on the scattered electric fields;
        determining equivalent magnetic surface currents on sidewalls of the structures based on the electric currents;
        simulating scattering parameters of the printed circuit board over a broad frequency range to characterize signal integrity based on the determined currents;
        modifying the geometry of the printed circuit board based on the signal integrity characterized by the simulated scattering parameters; and
        instructing another system to initiate design of the printed circuit board using the modified geometry.

2. The system of claim 1, wherein the microprocessor performs further actions when executing the computer instructions, the further actions comprising:
    determining radiated electric fields based on the equivalent magnetic surface currents; and
    modifying the geometry of the printed circuit board based on the determined currents and radiated electric fields.

3. The system of claim 1, wherein the microprocessor performs further actions when executing the computer instructions, the further actions comprising:
    determining waveguide modes for the waveguide;
    determining the electric currents on each of the via based on the scattered electric fields for lowest computed waveguide modes; and
    determining the equivalent magnetic surface currents on the sidewalls of the structure for higher order computed waveguide modes above the lowest computed waveguide modes.

4. The system of claim 1, wherein determining the reflection coefficients further includes:

determining the reflection coefficients using the broadband Green's functions combined with a Foldy-Lax method.

5. The system of claim 1, wherein determining the reflection coefficients further includes:
determining the reflection coefficients using the broadband Green's functions combined with a moment method.

6. The system of claim 1, wherein the structures that act as the waveguide include a pair of power and ground planes.

7. The system of claim 1, wherein instructing the other system to initiate design of the printed circuit board using the modified geometry includes:
instructing the other computer to initiate manufacturing of the printed circuit board using the modified geometry.

8. A method, comprising:
receiving, by a computer, a description of a geometry of a printed circuit board that includes vias and structures;
determining, by the computer, broadband Green's functions for the structures;
determining, by the computer, reflection coefficients from the broadband Green's functions for the structures;
determining, by the computer, scattered electric fields from the reflection coefficients;
determining, by the computer, electric currents on each of the vias based on the scattered electric fields;
determining, by the computer, equivalent magnetic surface currents on sidewalls of the structures based on the electric currents;
simulating, by the computer, scattering parameters of the printed circuit board over a broad frequency range to characterize signal integrity based on determined currents;
modifying, by the computer, the geometry of the printed circuit board based on the signal integrity characterized by the simulated scattering parameters; and
instructing, by the computer, another system to initiate design of the printed circuit board using the modified geometry.

9. The method of claim 8, further comprising:
determining, by the computer, radiated electric fields based on the equivalent magnetic surface currents; and
modifying, by the computer, the geometry of the printed circuit board based on the determined currents and radiated electric fields.

10. The method of claim 8, further comprising:
determining, by the computer, waveguide modes for the structures;
determining, by the computer, the electric currents on each of the via based on the scattered electric fields for lowest computed waveguide modes; and
determining, by the computer, the equivalent magnetic surface currents on the sidewalls of the structure for higher order computed waveguide modes above the lowest computed waveguide modes.

11. The method of claim 8, wherein determining the reflection coefficients further includes:
determining, by the computer, the reflection coefficients using the broadband Green's functions combined with a Foldy-Lax method.

12. The method of claim 8, wherein determining the reflection coefficients further includes:
determining, by the computer, the reflection coefficients using the broadband Green's functions combined with a moment method.

13. The method of claim 8, wherein the structures include a pair of power and ground planes.

14. The method of claim 8, wherein instructing the other system to initiate design of the printed circuit board using the modified geometry includes:
instructing, by the computer, the other computer to initiate manufacturing of the printed circuit board using the modified geometry.

* * * * *